(12) United States Patent  (10) Patent No.: US 9,156,606 B2
Goddard et al.  (45) Date of Patent: Oct. 13, 2015

(54) ION SEQUESTERING ACTIVE PACKAGING MATERIALS

(71) Applicants: Julie M. Goddard, Amherst, MA (US); Eric A. Decker, Sunderland, MA (US)

(72) Inventors: Julie M. Goddard, Amherst, MA (US); Eric A. Decker, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 14/358,262

(22) PCT Filed: Dec. 14, 2012

(86) PCT No.: PCT/US2012/069864
§ 371 (c)(1),
(2) Date: May 15, 2014

(87) PCT Pub. No.: WO2013/090794
PCT Pub. Date: Jun. 20, 2013

(65) Prior Publication Data
US 2014/0316011 A1    Oct. 23, 2014

Related U.S. Application Data

(60) Provisional application No. 61/570,417, filed on Dec. 14, 2011.

(51) Int. Cl.
*C08G 73/02* (2006.01)
*C08F 265/02* (2006.01)
*A61K 47/00* (2006.01)
*A23C 9/14* (2006.01)
*C08J 3/28* (2006.01)
(Continued)

(52) U.S. Cl.
CPC . *B65D 85/70* (2013.01); *A23L 3/34* (2013.01); *A23L 3/3463* (2013.01); *A23L 3/3598* (2013.01); *A61J 1/00* (2013.01)

(58) Field of Classification Search
CPC ...... A23L 3/3598; B65D 85/70; B65D 81/24; B65D 65/42; A61J 1/00; C08K 15/00; C08K 3/10
USPC ................ 525/185, 301; 514/772.1; 426/271; 522/120, 161
See application file for complete search history.

(56) References Cited

U.S. PATENT DOCUMENTS 3,068,122 A * 12/1962 Cline et al. ................. 428/475.5
2005/0139806 A1   6/2005 Havens et al.
2010/0062274 A1   3/2010 Leth

FOREIGN PATENT DOCUMENTS

WO    0115899 A1   3/2001
WO    2004089624 A2  10/2004

OTHER PUBLICATIONS

International Search Report in International Application No. PCT/US2012/069864 dated Apr. 26, 2013.

*Primary Examiner* — William Cheung
(74) *Attorney, Agent, or Firm* — Burns & Levinson LLP; Janine M. Susan

(57) ABSTRACT

The invention described herein provides a modified material is a packaging material in which, at least one side, the product contact side, has been modified to sequester ions in order to prevent the ions from being available to promote degradative reactions in biological or chemical products such as food, beverages, pharmaceuticals, neutraceuticals, cosmetics, paints and chemicals. The invention described herein also includes methods of making the packaging materials and methods of using the packaging materials for preserving the integrity of biological and chemical compounds.

28 Claims, 17 Drawing Sheets

(51) Int. Cl.
*B65D 85/00* (2006.01)
*A23L 3/3598* (2006.01)
*A61J 1/00* (2006.01)
*A23L 3/34* (2006.01)
*A23L 3/3463* (2006.01)

| Contact angle | Advancing (degree) | Receding (degree) | Hysteresis (degree) |
|---|---|---|---|
| PP | $105.9 \pm 1.2^a$ | $87.7 \pm 2.3^a$ | 18.2 |
| PP-BP | $106.6 \pm 1.8^a$ | $81.6 \pm 1.3^b$ | 25.0 |
| PP-g-PAA | $74.8 \pm 4.7^b$ | $18.3 \pm 5.0^c$ | 56.5 |

FIG. 19

ION SEQUESTERING ACTIVE PACKAGING MATERIALS

CROSS-REFERENCE TO RELATED APPLICATIONS

This application is a U.S. national stage application under 35 U.S.C. 371 of co-pending International Application No. PCT/US2012/069864 filed on Dec. 14, 2012 and entitled ION SEQUESTERING ACTIVE PACKAGING MATERIALS, which in turn claims priority to and benefit of U.S. Provisional Application No. 61/570,417, filed on Dec. 14, 2011, which is incorporated by reference herein in its entirety for all purposes.

BACKGROUND OF THE INVENTION

Oxidation is responsible for a number of degradative reactions in biological products, resulting in shortened shelf life, loss in color intensity, generation of unpleasant flavors and odors, loss in nutritional quality, and changes in physical characteristics. Such oxidation can also affect the bioactivity of natural components in consumer products such as anti-aging skin creams. The key components involved in oxidation of packaged products include free radicals to initiate the oxidative process, trace metals to catalyze the reaction, and oxygen to propagate the reaction, inhibiting any of these components can reduce the potential for oxidation and resulting product loss.

One strategy for reducing oxidation of packaged products has been to blend radical scavengers such as phenolic compounds, occurring naturally in many essential oils, into the packaging material. The method is typically quite costly and the resulting packaging materials suffer from poor stability both during the manufacturing process and storing period. Further, by incorporating the antioxidant throughout the packaging material, its bulk material properties can be adversely impacted.

Another strategy for reducing oxidation of packaged products has been to add metal chelators such as ethylenediamine tetraacetic acid (EDTA) or citric acid directly to the food product. Likewise, synthetic antioxidants such as butylatedhydroxytoluene (BHT) or butylatedhydroxyanisole (BHA) or natural free radical scavengers have been added directly to food products. Adding such chelators and antioxidants in the product formulation destroys the integrity of the food substance as an "all natural" product. In the case of natural free radical scavengers, such additions to foods are only moderately effective at inhibiting oxidation, are high in cost and have low stability.

Another strategy for reducing oxidation of packaged products has been to include an oxygen absorbing sachet within the package to reduce the oxygen content. Such sachets are inefficient at inhibiting oxidation, are not suitable for use in liquid products and require complicated packaging equipment.

There is a need for methods and materials that inhibit oxidation and other forms of degradation of biological and chemical products without the need to include additives in the product formulations.

BRIEF SUMMARY OF THE INVENTION

In one or more embodiments a packaging material is disclosed that is modified with one or more ion chelators covalently attached to at least one side of the material.

In one or more aspects of the packaging material, the material is films, particles, spheres, fibers, multilaminates, bioreactor packing material, bottles or jars.

In one or more aspects of the packaging material, the material is a polymer, glass, aluminum, magnetic core particles, naturally derived fibers and inorganic materials.

In one or more aspects of the packaging material, at least one modified side of the material is in contact with a product.

In one or more aspects of the packaging material, the product is food, beverages, pharmaceuticals, neutraceuticals, consumer products, paints or chemicals.

In one or more aspects of the packaging material, the consumer product is face creams, lotions, conditioners or cosmetics.

In one or more aspects of the packaging material, the one or more ion chelators is deferoxamine, ethylene diaminetetraacetic acid, poly(acrylic acid), hydroxamic acid, biomimetic synthetic siderophores, desferroxamine-analogs with hydroxamic acid functionality, or combinations thereof.

In one or more aspects of the packaging material, the polymer is a thermoplastic polymer, such as polyethylene, polypropylene, polyester, polystyrene, nylon or vinyls.

In one or more aspects of the packaging material, the polyester is polyethylene Terephthalate or polylactic acid.

In one or more aspects of the packaging material, the vinyl is ethylene vinyl acetate, ethylene vinyl alcohol, polyvinyl chloride or polyvinylidine chloride.

In one or more aspects of the packaging material, the polymer is a hydrogel-forming polymer, such as hydroxyethylmethacrylate, chitosan and polyethyleneglycol.

In one or more aspects of the packaging material, the polymer is polydimethylsilexane.

In one or more embodiments a method of making an ion chelator-modified material is disclosed including the steps of exposing unmodified material to ultraviolet radiation; attaching a cross-linking agent to at least one surface of the irradiated material; and attaching one or more ion chelators to said cross-linking agent.

In one or more aspects of the method of making an ion chelator-modified material, the material is a polymer.

In one or more aspects of the method of making an ion chelator-modified material, the cross-linking agent is an amine compound.

In one or more aspects of the method of making an ion chelator-modified material, the amine compound is polyethylenimine or ethylenediamine.

In one or more aspects of the method of making an ion chelator-modified material, the one or more ion chelators is deferoxamine, ethylene diaminetetraacetic acid, poly(acrylic acid), hydroxamic acid, biomimetic synthetic siderophores, desferroxamine-analogs with hydroxamic acid functionality, or combinations thereof.

In one or more embodiments a method of preserving, a product is disclosed including the steps of storing a product in a packaging material having one or more ion chelators covalently attached to at least the side of the packaging material in contact with the product.

In one or more aspects of the method of preserving a product, the material is films, particles, spheres, fibers, muitilaminates, bioreactor packing material, bottles or jars.

In one or more aspects of the method of preserving a product, the material is a polymer, glass, aluminum, magnetic core particles, naturally derived fibers or inorganic materials.

In one or more aspects of the method of preserving a product, the product is food, beverages, pharmaceuticals, nentraceuticals, consumer products, paints or chemicals.

In one or more aspects of the method of preserving a product, the consumer product is face creams, lotions, conditioners or cosmetics.

In one or more aspects of the method of preserving a product, the one or more ion chelators is/are deferoxamine, ethylene diaminetetraacetic acid, poly(acrylic acid), hydroxamic acid, biomimetic synthetic siderophores, desferroxamine-analogs with dydroxamic acid functionality, or combinations thereof.

In one or more aspects of the method of preserving a product, the polymer is a thermoplastic polymer, such as polyethylene, polypropylene, polyester, polystyrene, nylon or vinyls.

In one or more aspects of the method of preserving a product, the polyester is polyethylene Terephthalate ear polylactic acid.

In one or more aspects of the method of preserving a product, the vinyl is ethylene vinyl acetate, ethylene vinyl alcohol, polyvinyl chloride or polyvinylidine chloride.

In one or more aspects of the method of preserving a product, the polymer is a hydrogel-forming polymer, such as hydroxyethylmethacrylate, chitosan or polyethyleneglycol.

In one or more aspects of the method of preserving a product, the polymer is polydimethylsiloxane.

In one or more aspects of the method of preserving a product, the preserving occurs by inhibiting lipid oxidation.

In one or more aspects of the method of preserving a product, the preserving occurs by inhibiting loss of nutrients.

In one or more aspects of the method of preserving a product, the preserving occurs by inhibiting color loss.

A number of other embodiments of the system and a method of these teachings are also disclosed.

For a better understanding of the present teachings, together with other and further needs thereof, reference is made to the accompanying drawings and detailed description and its scope will be pointed out in the appended claims.

BRIEF DESCRIPTION OF THE DRAWINGS

FIG. 19 is a table of advancing and receding contact angle values for films at various stages of the modification process—PP are unmodified, virgin polypropylene films. PP-BP are polypropylene films treated with benzophenone photoinitiator. PP-g-PAA are the acrylic acid grafted polypropylene films, and different superscript letters indicate significant differences at P<0.05.

DETAILED DESCRIPTION

Figure 1:
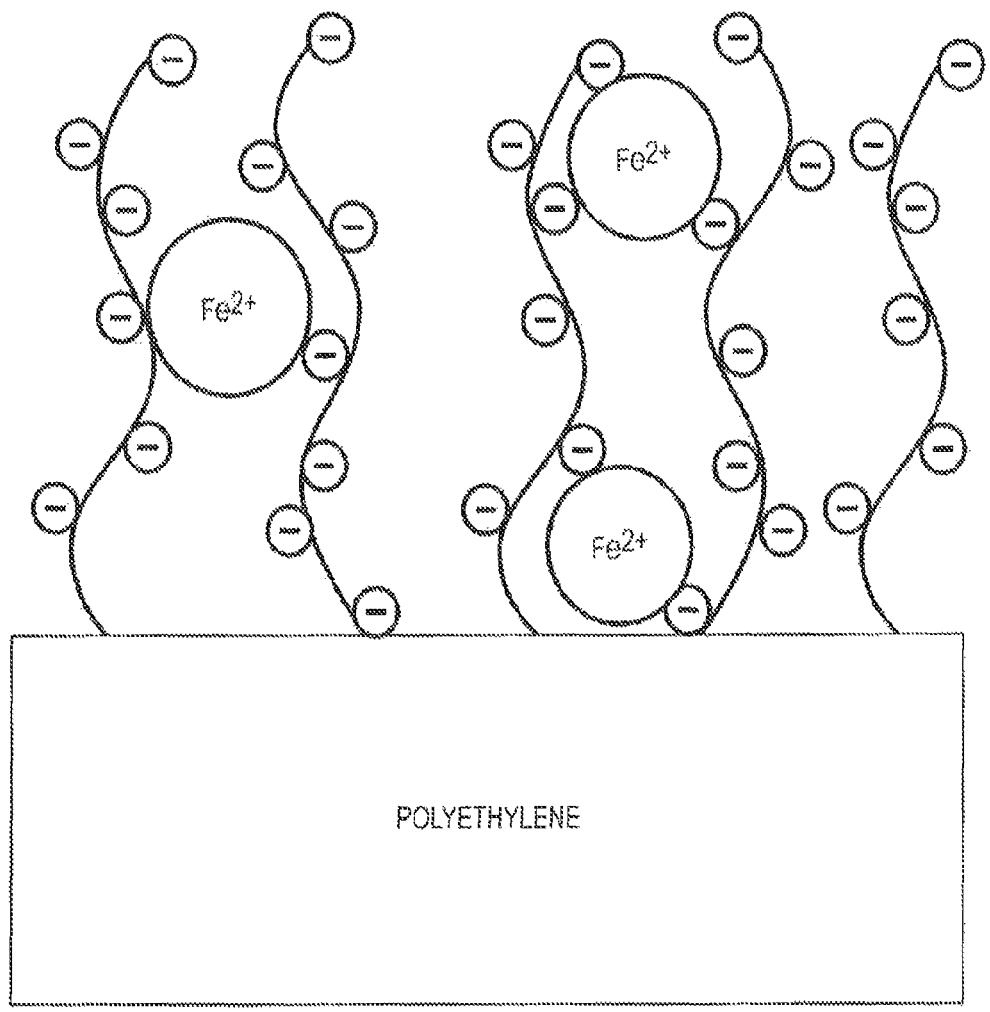
FIG. 1 is a diagram of a representative antioxidant packaging material of the invention.
Figure 2:
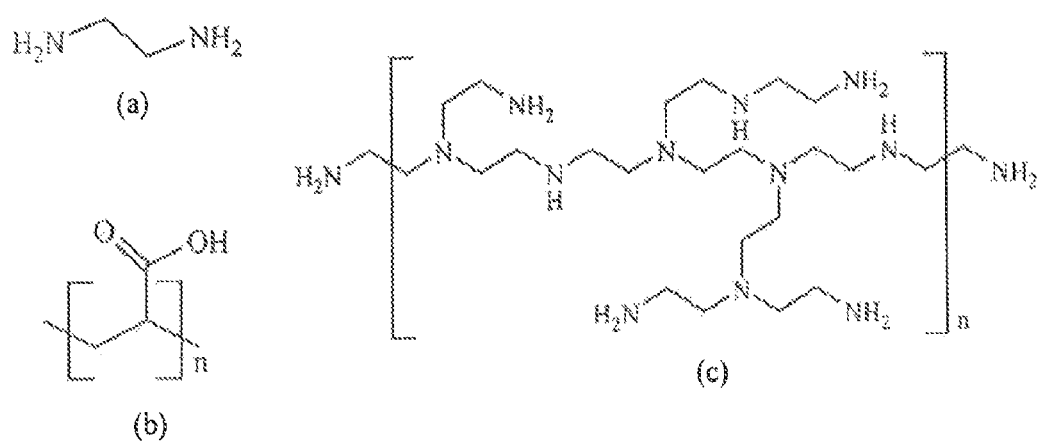
FIG. 2 is a drawing of the chemical structures of (a) ethylene diamine (ED); (b) poly(acrylic acid) (PAA); and (c) polyethylenimine (PEI)

The invention described herein provides a material in which at least one side has been modified to sequester ions. The material types include, but are not limited to, a polymer, glass, aluminum, magnetic core particles, naturally derived fibers or inorganic materials. The material can be in the form of planar films, extruded films, particles, spheres, multilaminates, bioreactor packing materials, woven or nonwoven fibers, or blow-molded bottles or jars.

In one or more embodiments the modified material is a packaging material in which the product contact side has been modified to sequester ions in order to prevent the ions from being available to promote degradative reactions in biological or chemical products such as food, beverages, pharmaceuticals, neutrareuticals, cosmetics, paints and chemicals.

The modified material can be used in inhibiting lipid oxidation in food, paints or consumer products, such as face creams, lotions, conditioners and cosmetics. The modified material can be used in inhibiting loss of nutrients in packaged products. The modified material can be used in inhibiting color loss in packaged products. The modified material can be used in purifying water. The modified material can be used in biomedical chelating therapies i.e., heavy metal chelation. The modified material can be used in providing antimicrobial or bacteriostatic activity for packaged products. The modified material can be used in enhancing antimicrobial activity of antimicrobial agents, e.g., lysozyme, nisin or bacteriocins. The modified material can be used alone or in concert with antimicrobial and bacteriocidal agents to prevent growth of pathogens, molds and yeasts. The modified material can be used to prevent spoilage of foods by microbial growth, and prevent food borne illness by pathogenic microorganisms. The modified material can be used to bind metal ions so that the functionality of food components are not altered through pathways that do not involve oxidation. Examples include, metal copigmentation with colorants, changes in solubility of food components by ions (e.g. calcium precipitation of proteins or other polymers) and inhibition of metal containing enzymes (e.g. browning by polyphenyl oxidase).

In one or more embodiments sequestering agents are linked to the surface of a material by covalent linkages, in one or more preferred embodiments the side of the material being modified is in contact with a product. The sequestering agents will not migrate into the products thereby maintaining the integrity of the formulations of the products or "all natural" status of the products and do not need to be labeled as additives in the case of food or beverage products.

In one or more embodiments the modified material is a polymer including, but not limited to, thermoplastic polymers such as polyethylene (high density and low density, linear and nonlinear), polypropylene (orientated and nonorientated), polyesters (e.g. polyethylene Terephthalate, polylactic acid), polystyrene, vinyls, ethylene vinyl acetate, nylon, ethylene vinyl alcohol, polyvinyl chloride, polyvinylidine chloride, as well as hydrogel forming polymers such as hydroxyethylmethacrylate, chitosan, or polyethyleneglycol, and cross-linkable soft polymers such as polydimethysiloxane.

In one or more embodiments a material is modified by graft polymerizing a functional monomer onto the surface via ultraviolet light, ozone, plasma, or chemical initiation. Polymerization techniques may utilize initiation via ultraviolet light, ozone, free radical, or other initiator (e.g. benzophenone, peroxides, azoisobutylintrile, redox reactions, persulfates, ionizing radiation, electrochemical, or plasma). Alternatively, a material is modified by immobilizing a functional agent onto the material by wet chemistry methods such as coating spraying or printing or by physical chemistry methods such as UV-curing, plasma curing or corona treating.

The functional agent (monomer or otherwise) can use electrostatic (i.e. positive or negative charge) moieties for non-specific sequestering or chelating of ions from the packaged biological product onto the active packaging material, or can be designed for ligand-specific chelation.

Ions that can be specifically targeted for sequestering by the packaging materials of the invention include but are not limited to iron, mercury, copper, calcium and magnesium.

Ion chelating moieties or ion sequestering agents of the invention include deferoxamine or deferoxamine derivatives, ethylene diaminetetraacetic acid (EDTA) or EDTA derivatives, poly(acrylic acid) (PAA) or PAA derivatives, polyphosphates or polyphosphate derivatives, hydroxamic acids or hydroxamic acid derivatives, biomimetic synthetic versions of siderophores, desferroxamine-analogs with hydroxamic acid functionality, molecules with chelating ligands similar in chemistry to deferoxamine, EDTA err PAA and combinations thereof. Derivatives include synthetically fabricated compounds which have the same chemical functionality as ion sequestering agents from biological sources. Derivatives also include improvements to the chelating capacity of biological or synthetic ion sequestering agents.

One or more embodiments provides an antioxidant packaging material with iron chelators covalently attached to the surface of polyethylene (PE) films. Poly(acrylic acid) (PAA), a strong metal chelator used in water purification, was used as the iron chelator to impart antioxidant capacity to the novel packaging material. Amine compounds (polyethylenimine (PEI) and ethylenediamine (ED)) with different molecular weights were used as the cross-linking agents to covalently bind PAA to PE surface.

In one embodiment of the invention a metal chelating active packaging material was developed by the covalent immobilization of PAA to a functionalized PE surface. As cross-linking agents, low molecular weight homobifunctional amine compound ED introduced more available carboxylic acids to PE surface than the high molecular weight branched amine compound PEI. After being immobilized to PE surface, PAA could still perform its iron chelating capacity, and PE-ED-PAA exhibited an iron chelating activity of $2.43\pm0.22$ nmol ferrous iron per $cm^2$ and $4.44\pm0.38$ nmol ferric iron per $cm^2$, respectively. As the ligand-metal ratio for $Fe^{3+}$ was lower than that for $Fe^{2+}$, PAA-modified PE films may have a higher affinity to $Fe^{3+}$ with the optimum binding pH at 5.0.

In another embodiment of the invention a metal chelating active packaging material was developed by the ultraviolet-light initiated graft polymerization of acrylic acid monomer from the surface of polypropylene films using benzophenone as an initiator. The resulting films were denoted PP-g-PAA, with the virgin polypropylene films denoted as PP in the attached figures. PP-g-PAA films performed iron chelating capacity for ferrous iron (71 nmol ferrous iron per $cm^2$) at pH 5.0. Oxidation studies were performed in which an oil-in-water emulsion was prepared and evaluated for production of lipid hydroperoxides and hexanal (two markers of lipid oxidation) after storage at 37° C. for up to seven days. Control emulsion (no film) and emulsion stored with virgin PP coupons exhibited oxidation within two to three days. Emulsions stored with the active packaging material, PP-g-PAA, performed as well as emulsions containing the synthetic additive EDTA and did not produce any detectable lipid hydroperoxides or hexanal over the course of the 7-day accelerated study.

A representative embodiment of the invention is shown in FIG. 1. The surface of a material, such as polyethylene or polypropylene, is modified by grafting an ion chelator, such as acrylic acid polymer, thereto. Ferrous ions are shown bound in the polymer brush structure. By limiting the active component to the top several nanometers of the packaging material, bulk material properties (mechanical, thermal stability, machinability, transparency, etc) are retained. By grafting the ion sequestering agent using covalent linkages, migration to the packaged product is unlikely.

EXAMPLE 1

Materials

Low-density polyethylene (PE, pellets) and poly(acrylic acid) (PAA, $M_w$=450,000) were purchased from Scientific Polymer Products (Ontario, N.Y.); 1-ethyl-3-(3-dimethylaminopropyl)carbodiimide hydrochloride (EDC) was purchased from ProteoChem (Denver, Colo.); N-hydoxysuccinimide (NHS), hydroxylamine hydrochloride, ferrous sulfate heptahydrate (99+%), imidazole (99%), and 3-(2-pyrinyl)-5, 6-diphenyl-1,2,4-triazine-p,p'-disulfonic acid disodium salt hydrate (ferrozine, 98+%) were purchased from Acros Organics (Morris Plains, N.J.); polyethylenimine (PEI, branched, $M_w$ 25,000, $M_n$ 10,000) was purchased from Sigma-Aldrich (St. Louis, Mo.); ethylenediamine (70%) was purchased from Ricca Chemical Company (Arlington, Tex.); toluidine blue O (TBO) was purchased from MP Biomedicals (Solon, Ohio); isopropanol, acetone, sodium carbonate, sodium bicarbonate, sodium acetate trihydrate, 4-(2-hydroxyethyl)-1-piperazineethane-sulfonic acid (HEPES), hydrochloric acid, trichloroacetic acid (TCA), acetic acid glacial, ferric chloride anhydrous, and sodium hydroxide were purchased from Fisher Scientific (Fair Lawn, N.J.); MES sodium salt was purchased from GenScript (Piscataway, N.J.).

Preparation and Pretreatment of PE Films

PE films with the average thickness of 250±50 μm were prepared with a Carver Laboratory Press (Model B, Fred S. Carver Inc., NJ, U.S.A). PE pellets were cleaned by sonicating in isopropyl alcohol, acetone, and deionized water (10 min per repetition, 2 repetitions per solvent) sequentially. The cleaned PE pellets were dried overnight over anhydrous calcium sulfate. The temperature of the Carver Press was set to 130° C. to melt PE pellets for 1 min, and 9000 lbs pressure was then loaded to press pellets into films. Large pieces of films were cut to 1×2 cm² pieces and cleaned and dried by the same procedure as the PE pellets. Cleaned films were then treated for 15 min per side in an ultraviolet/$O_3$ cleaner (UV/$O_3$, Model 42, Jelight Company, INC. Irvine, Calif.) to create active carboxylic acid groups on the surface of both sides.

Surface Functionalization of PE

Figure 3:
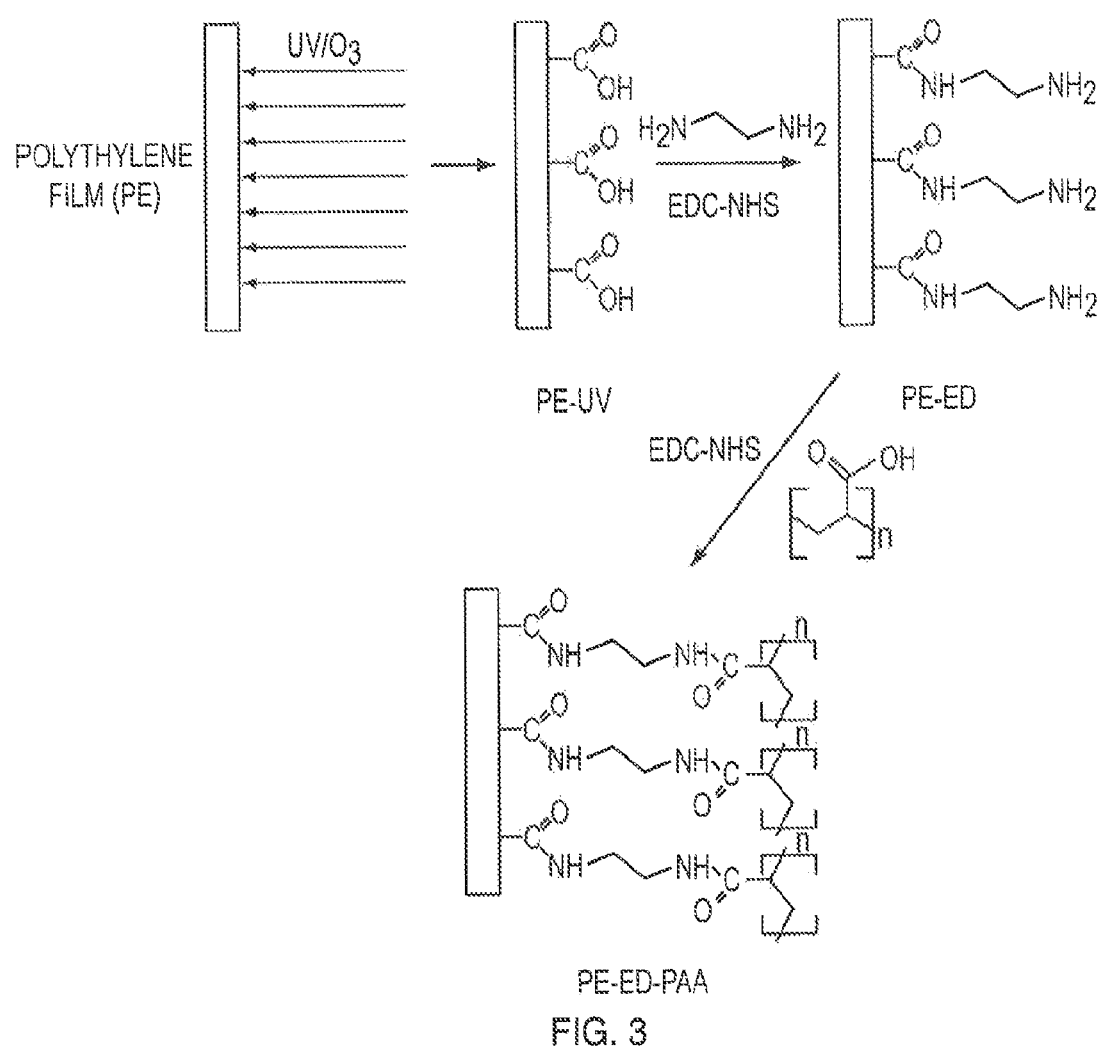
FIG. 3 is a diagram of sequential reaction steps for one example of a process for making an antioxidant packaging material of the invention showing poly(acrylic acid) covalent immobilization on polyethylene films using ethylenediamine as the cross-linking agent.

A two-step chemical reaction was used to covalently immobilize metal chelator PAA to the PE film surface (FIG. 3). Cross-linking agent (PEI or ED) was first attached to the film surface through the formation of amide bonds between amine groups from the cross-linking agent and the carboxylic acid groups from the UV pretreated PE surface. PAA was then attached to the amine-modified PE surface also through the amide bonds to increase the number of available metal chelating carboxylic acids.

Grafting of Cross-Linking Agents

PEI or ED was covalently attached to the UV treated film using a modification of the method of Goddard, et al. (Goddard, Talbert & Hotchkiss, *J. Food Sci* 2007, 72, E36-E41). The conjugation solution was composed of 30 mg/mL PEI (or ED), 50 mM EDC, and 5 mM NHS in 0.1 M pH 9.6 sodium carbonate buffer. Films were shaken in the conjugation solution for 1 h at 25° C., followed by rinsing in copious purified water 3 times.

Grafting of PAA

Surface amine groups were modified with PAA to generate chelating carboxylic acid groups through the formation of amide bonds (Goddard & Hotchkiss, *J. Appl. Polym. Sci.* 2008, 108, 2940-49). The conjugation solution was composed of 1 mg/mL PAA, 50 mM EDC, and 5 mM NHS in 0.1 M pH 6.5 MES buffer. Films were shaken in the conjugation solution for 1 h at 25° C., followed by rinsing in copious purified water 3 times.

Surface Analysis

ATR-FTIR Analysis

Changes in surface chemistry before and after the modification were determined using ATR-FTIR spectroscopy, which was conducted on an IRPrestige-21 FTIR spectrometer (Shimadzu Scientific Instruments, Inc., Kyoto, Japan) with sample compartments and a diamond ATR crystal. Each spectrum represents 32 scans at a 4-$cm^{-1}$ resolution taken against a reference spectrum of an empty ATR crystal. The resultant spectra were processed with SigmaPlot 10.0 (Systat Software, Inc., Chicago, Ill.) and analyzed with KnowItAll Informatics System 8.1 (BioRad, Hercules, Calif.).

Contact Angle Analysis

The hydrophilicity of polymer surfaces was also measured after each step in the modification. To measure surface hydrophilicity, the static sessile drop method was used to measure the water contact angles of PE and modified PE films (n=6, two measurements on each of three separate films) were measured on a DSA 100 (Kruss, Hamburg, Germany) with HPLC grade deionized water.

TBO Dye Assay

TBO dye complexes with available carboxylic acids under basic conditions, and can be desorbed in acidic solution to be quantified spectrophotometrically. The carboxylic acid density on PE and modified PE surface was determined. Control and modified PE films were shaken for 2 h in 0.5 mM TBO solution (in deionized water adjusted to pH 10.0 by NaOH) at 25° C. The films were then rinsed with NaOH solution (pH 10.0) 3 times to remove non-complexed dye. Complexed dye on the film surface was desorbed by submerging films in 50 wt % acetic acid for 15 min. The absorbance of the acetic acid solution was then detected at 633 nm and compared to a standard curve made of TBO in 50 wt % acetic acid. The determination of each sample was quadruplicate.

Iron Chelating Assay

The ability of PE, and modified PE films to bind $Fe^{2+}$ $Fe^{3+}$ iron was determined using ferrozine, a specific reagent that forms a red colored complex (absorption maximum at 562 nm) with ferrous ions. A solution of ferrous sulfate heptahydrate (or ferric chloride) (20 mM, in 0.05 M HCl) was added into 0.05 M sodium acetate/imidazole buffer (pH 3.0, 5.0, and 7.0) to make the iron buffer mixture with the final $Fe^{2+}$ concentration of 1 mM (0.01 mM for ferric chloride). Four pieces of PE and the modified PE films (PE-UV, PE-ED, PE-ED-PAA, PE-PEI, PE-PEI-PAA; two-side treated) were put into a centrifuge tube with 20 mL of iron buffer solution and rotated for 30 min. The films were then taken out, and washed in deionized water 3 times to wash off the unbound iron. Releasing agent was prepared with hydroxylamine hydrochloride (0.72 M) and TCA (0.61 M) to release iron from films, and also to reduce $Fe^{2+}$ to $Fe^{2+}$ iron. Each piece of film was submerged in 1.0 mL releasing agent and rotated for 2.5 h. The releasing agent was then reacted with ferrozine solution (9.0 mM in 50 mM HEPES buffer, pH 7.0) with the ratio 1:1 (v/v) at room temperature (25° C.) for 1 h. The absorbance of the solution was then detected at 562 nm and normalized to a hydroxylamine hydrochloride, TCA, ferrozine solution negative control. The results were compared to a ferrous iron calibration curve, and the determination of each sample was quadruplicate.

Statistical Analysis

The data presented are means±standard deviation (SD) of four determinations. Statistical analyses were conducted using SPSS Release 17.0 (SPSS Inc., Chicago, Ill.). One-way analysis of variance (ANOVA) followed by Duncan's pairwise comparison was conducted to determine differences ($P<0.05$).

ATR-FTIR Analysis of Surface Chemistry

Figure 4:
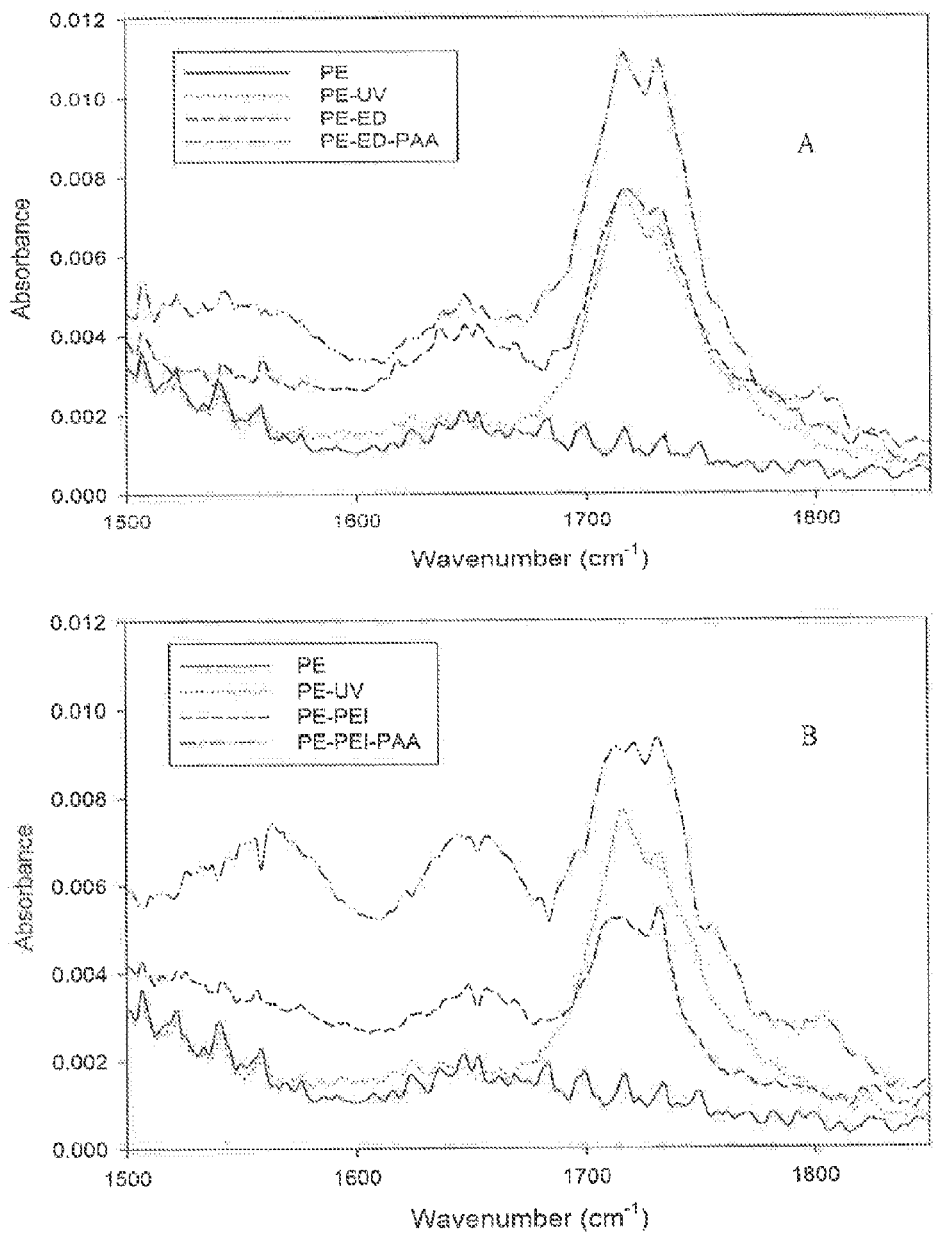
FIG. 4A is an ATR-FTIR spectra of PE, PE-UV, and PAA modified PE using ED as the cross-linking agent.
FIG. 4B is an ATR-FTIR spectra of PE, PE-UV, and PAA modified PE using PEI as the cross-linking agent.

The ATR-FTIR spectra of PE and modified PE (PE-UV, PE-PEI, PE-ED, PE-PEI-PAA, and PE-ED-PAA) are shown in FIGS. 4A-B. The spectra can be separated into three regions corresponding to: (1) the intense C=O band of carboxylic acid groups at 1725-1700 $cm^{-1}$; (2) the C=O band of amide groups at 1680-1630 $cm^{-1}$; (3) the C—N and N—H combination band of amide groups at 1570-1515 $cm^{-1}$.

The PE surface did not have significant absorbance in the range of 1500 to 1850 cm$^{-1}$ (FIG. 4A and FIG. 4B), representing a clean native polyethylene film. After the functionalization by UV/O$_3$ treatment, the absorbance band at 1725-1700 cm$^{-1}$ was shown in the spectra of PE-UV surface (FIG. 4A and FIG. 4B) due to the creation of carboxylic acid groups. After the grafting of cross-linking agent ED or PEI, amide groups were formed between amine and carboxylic acid groups, and absorbance at 1680-1630 cm$^{-1}$ and 1570-1515 cm$^{-1}$ was shown in the ATR-FTIR spectra of PE-ED (FIG. 4A) and PE-PET (FIG. 3B). The spectra of PE-PEI also showed a decrease of the absorbance at 1725-1700 cm$^{-1}$ compared to that of PE-UV and PE-ED. Without intending to be bound by theory, this may be due to the fact that PEI contains much more amine groups than ED, and more carboxylic acid groups were consumed on the surface of PE-UV to react with PEI. After the grafting of PAA, a significant increase of the absorbance at 1725-1700 cm$^{-1}$ was evident in the spectra of both PE-ED-PAA (FIG. 4A) and PE-PEI-PAA (FIG. 4B) compared to PE-ED and PE-PEI. This indicates that PAA was successfully immobilized to the surface of PE-ED and PE-PEI. The spectra also showed that much more amide groups were formed on the surface of PE-PEI-PAA than that of PE-ED-PAA, further confirming successful modification of the material.

Surface Hydrophilicity

Figure 5:
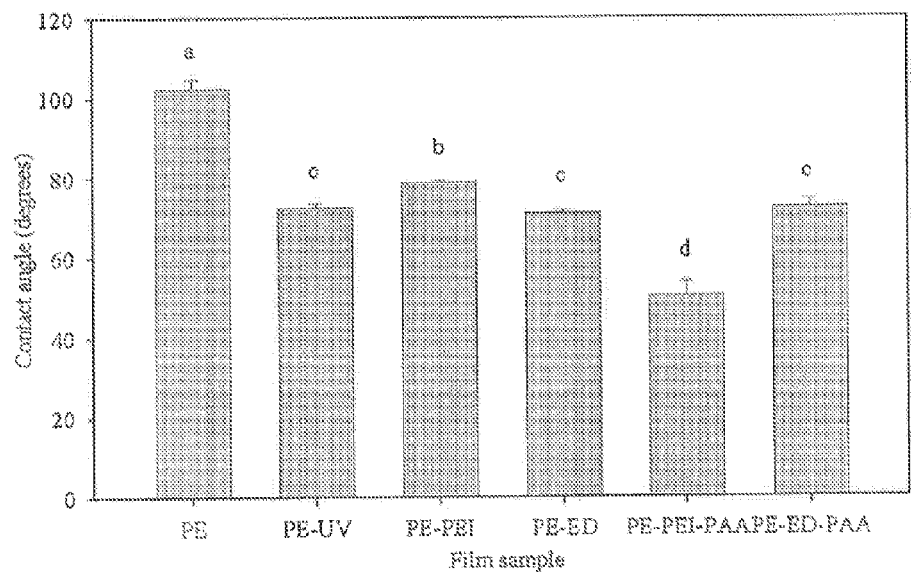
FIG. 5 is a bar graph of the water contact angle of PE and modified PE films: values are means of six replications collected from three independent films (n=6, +/−SD) and different letter indicate significant differences (P<0.05)

The surface hydrophilicity of PE and modified PE films was evaluated by their water contact angles using the static sessile drop method (FIG. 5). It was noted that the UV/O$_3$ functionalization brought the contact angle from 102.40±2.41 degrees of PE films down to 72.61±1.08 degrees of PE-UV films indicating that the hydrophilicity was significantly increased (P<0.05). Without intending to be bound by theory, this is likel a result of the introduction of a range of polar groups, including ionizable carboxylic acids, after UV/O$_3$ treatment. In comparison to UV/O$_3$ functionalized films, the contact angle was not changed after the grafting of ED, but increased after the grafting of PEI. Without intending to be bound by theory, one possible reason would be the higher hydrophilicity of carboxylic acids, present as a result of UV/O$_3$ treatment, than that of PEI. This is supported by work demonstrating that carboxylic acids may contribute more to wettability than primary amines. Since ED is a small molecule, most of the carboxylic acids present on the surface of the UV/O$_3$ functionalized polyethylene would be still exposed after ED conjugation, explaining the lower contact angle of PE-ED than PE-PEI. This is supported by the ATR-FTIR spectra of PE-UV and PE-ED which both show strong absorbances associated with carboxylic acids (FIG. 4A). After the grafting of the high molecular weight branched polymer PEI, more carboxylic acids were involved in the conjugation reaction and covalently attached to PEI, which was confirmed by the ATR-FTIR spectra of PE-UV and PE-PEI (FIG. 4B), and the increase in hydrophobicity of the PE-PEI film compared to both PE-UV and PE-ED is likely a result of the relatively more hydrophobic PEI polymer layer. The grafting of PAA decreased the contact angle of PE-PEI from 78.92±0.56 to 50.41±3.47 degrees, which might be attributed to the formation of the hydrophilic matrix network between cationic polyelectrolyte PEI and anionic polyelectrolyte PAA. Notably, PE-PEI-PAA films exhibited a more hydrophilic surface than both PE-PEI and PE-ED-PAA films. This surprising and counterintuitive observation could be due to a synergistic effect between the two layers of polyelectrolytes, which when deposited in conjunction have a stronger effect on hydrophilicity than when deposited individually. However, no difference was observed between the contact angle of PE-UV, PE-ED and PE-ED-PAA (P>0.05). This might because that the surface of PE-UV was already fully covered with the carboxylic acid out layer, and grafting of PAA would not further increase the surface hydrophilicity.

Carboxylic Acid Density

Figure 6:
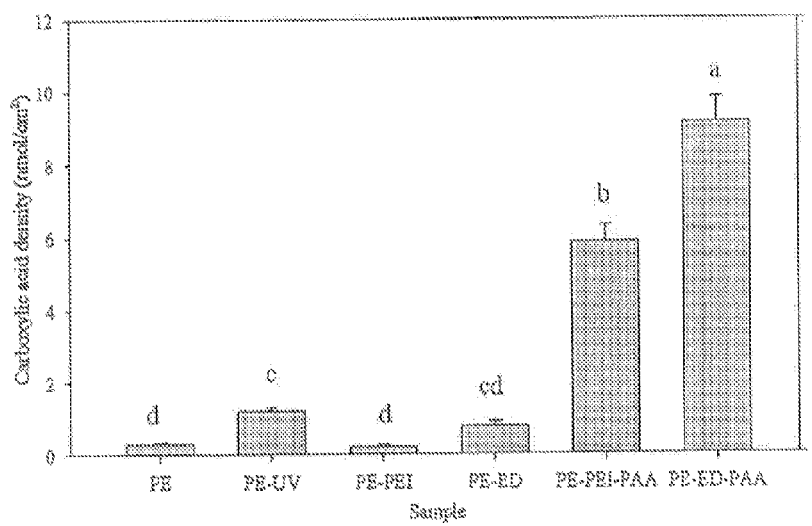
FIG. 6 is a bar graph of the carboxylic acid density on the surface of PE and modified PE films: values are means of four independent films (n=4, +/−SD) and different letter indicate significant differences (P<0.05)

The density of available carboxylic acid groups on the surface of PE and modified PE films was measured using the toluidine blue O (TBO) dye assay, and the results are shown in FIG. 6. After the functionalization with UV/O$_3$ treatment, a small amount (1.19±0.12 nmol/cm$^2$) of available carboxylic acid groups were created on PE surface, which can be used to conjugate with cross-linking agents. After the conjugation of PEI, the available carboxylic acid groups on the PE surface significantly decreased (P<0.05). The loss of the available carboxylic acids was not significant (P>0.05) after the conjugation of ED. These were consistent with the results showed in the ATR-FTIR spectra. The significant increase of available carboxylic acid density on the surface of PE-PEI-PAA (5.86±0.47 nmol/cm$^2$) and PE-ED-PAA (9.12±0.71 nmol/cm$^2$) confirmed the successful immobilization of PAA. In addition, the available carboxylic acid density on the PE-ED-PAA surface was higher than that on the PE-PEI-PAA surface (P<0.05). PEI, containing more amine groups than ED, did not introduce more available carboxylic acids to PE surface. The high number of primary amines present on PEI could have reacted with a larger number of carboxylic acids on PAA to form amide bonds, resulting in fewer available carboxylic acids in PE-PEI-PAA films compared to PE-ED-PAA films.

Iron Chelating Activity

The two most common types of iron are ferrous (Fe$^{2+}$) and ferric (Fe$^{3+}$) Ferric is the oxidized form of ferrous. In terms of lipid oxidation, ferrous is the stronger pro-oxidant of the two due to its higher water solubility and higher reactivity in decomposing lipid hydroperoxides into free radicals. Ferric is less reactive, but it can be reduced to ferrous to promote lipid oxidation. Both ferrous and ferric iron chelating activities of PE and modified PE films were measured with iron chelating assay at pH 5.0, and the results are shown in FIG. 7 and FIG. 8.

Figure 7:
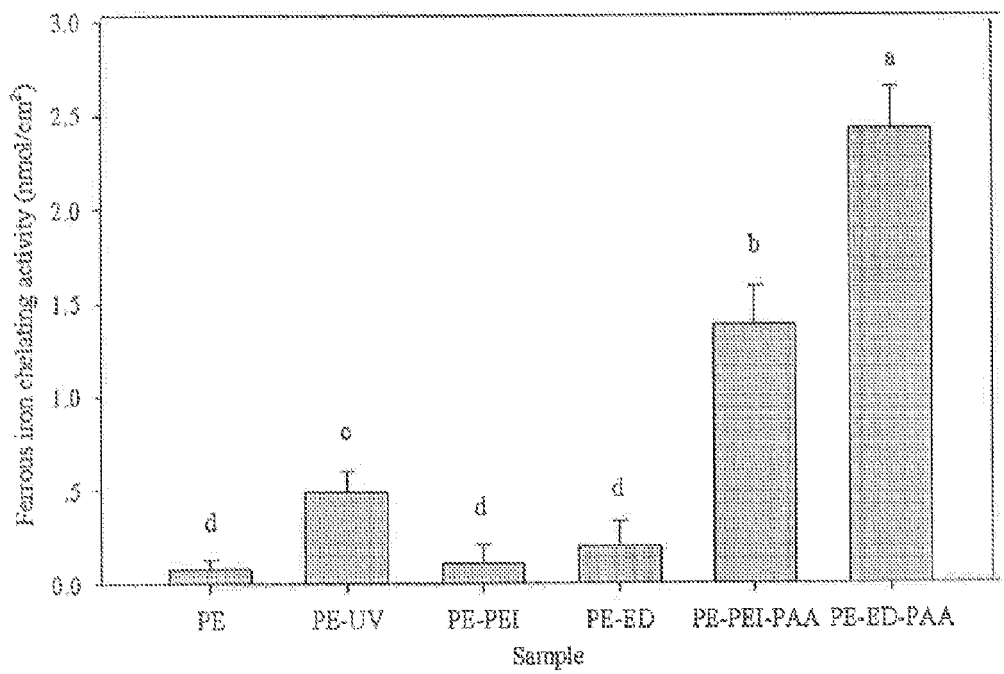
FIG. 7 is a bar graph of the ferrous iron chelating activity of PE and modified PE films: values are means of four independent films (n=4, +/−SD) and different letter indicate significant differences (P<0.05)

The results in FIG. 7 indicate that PE-UV, PE-PEI-PAA, and PE-ED-PAA all had ferrous iron chelating activity. Both of PE-PEI-PAA and PE-ED-PAA had much stronger ferrous iron chelating activity than PE-UV. After being covalently immobilized to the PE surface, PAA could still participate in iron chelating. For the PAA-modified PE, films, PE-ED-PAA showed stronger ferrous iron chelating activity than PE-PEI-PAA (P<0.05). These findings were consistent with the results of dye assay. The more available carboxylic acids on the surface, the stronger the ferrous iron chelating activity. In addition, according to the results of the dye assay and the ferrous iron chelating assay for PE-PEI-PAA and PE-ED-PAA, the ligand to metal ratio was about 4. This means four carboxylic acid ligands were needed to chelate one ferrous ion to form the ligand-metal complex on the PAA-modified PE surface. According to general chelation chemistry, two parts of carboxylic acids bind with one part of divalent metal ion to form a (COOH)$_2$:Fe$^{2+}$ complex. The increase of the ligand-metal ratio could be due to the diffusion limitation of iron coming to react with ligands on film surfaces. The steric hindrance effect from the surrounding groups could also contribute to the loss of activity. Even though amide groups formed between cross-linking, agents and PAA have oxygen and nitrogen atoms, which could donate a pair of electrons for the formation of a bond with ferrous iron, they may not have been involved in the complexation reaction.

Figure 8:
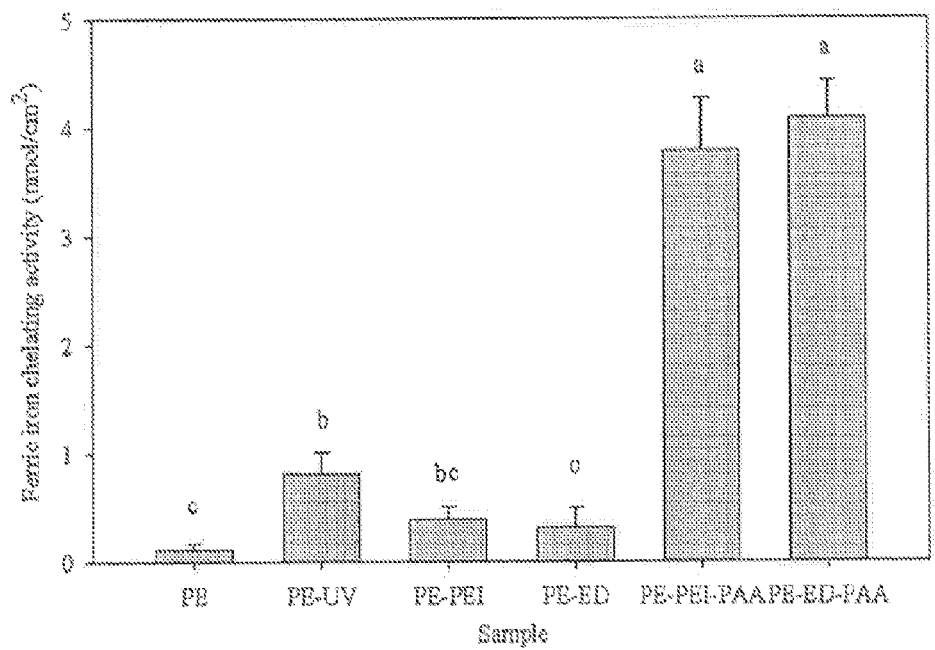
FIG. 8 is a bar graph of the ferric iron chelating activity of PE and modified PE films at different pH values; values are means of four independent films (n=4, +/−SD) and different letter indicate significant differences (P<0.05)

The ferric iron chelating activities of PE and modified PE films are depicted in FIG. 8. In comparison to the virgin PE, PE-UV, PE-PEI-PAA, and PE-ED-PAA also showed significant ferric iron chelating activity. The activity of PE-PEI-PAA and PE-ED-PAA was also stronger than PE-UV. However, the two kinds of PAA-modified PE films using different cross-linking agents presented similar ferric iron chelating activity (P>0.05). Moreover, their ferric iron chelating activities were significantly stronger than their ferrous iron chelating activities (P<0.05). The (COOH):$Fe^{3+}$ ratio was 1.5 for PE-PEI-PAA and 2 for PE-ED-PAA. Ferric ions have six coordination sites, and ligands with six coordinating atoms surrounding them would provide three negative charges to balance the three positive charges of $Fe^{3+}$ to form stable iron complexes. The lower limit of coordinated carboxylic acids should be 3. However, ferric ion is ruled out as being involved in the complexation with carboxylic acid groups by the ligand-metal ratio of 1.5 or 2. Without intending to be bound by theory, this is either because of the formation of cationic polymer-metal complexes, or because of the precipitation of ferric hydroxide in the crosslinked polymer matrix on the surface. It has been reported that free amine groups are capable of chelating with various transition metal ions such as $Co^{2+}$ and $Cu^{2+}$ to form cationic polymer-metal complexes. The solubility of $Fe^{3+}$ is very low in aqueous solution with high pH, and ferric hydroxide could be generated to form a precipitate. The pH 5.0 sodium acetate/imidazole buffer used to do the ferric iron chelating assay, and at this pH $Fe^{3+}$ is not expected to be fully soluble.

Effect of pH on the Chelation of $Fe^{3+}$

Figure 9:
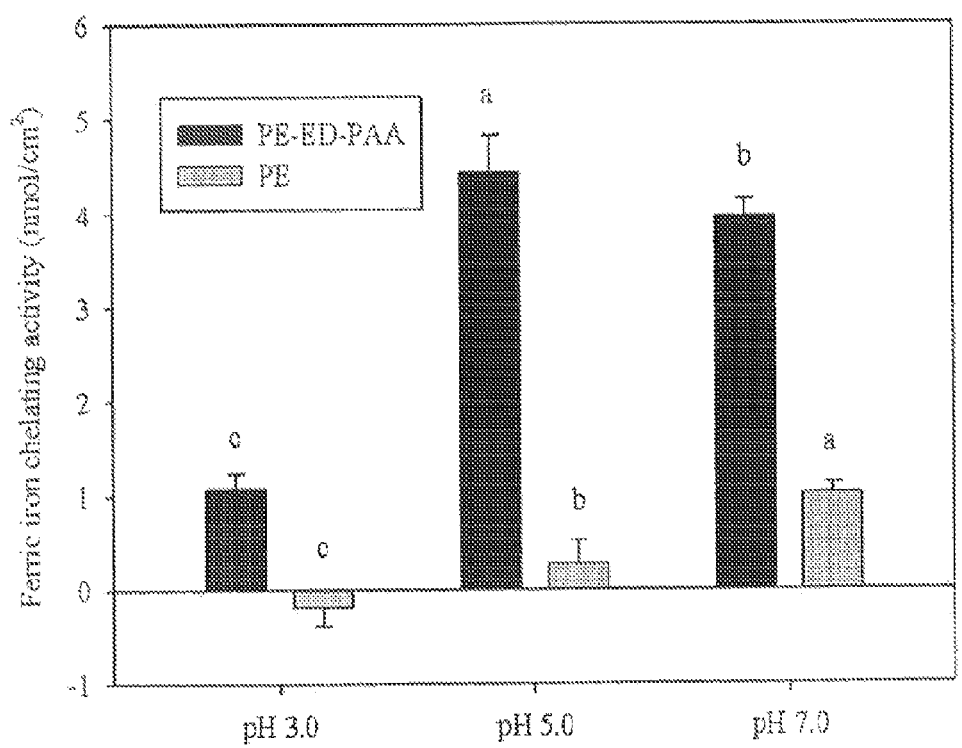
FIG. 9 is a bar graph of the ferric iron chelating activity of PE and PE-ED-PAA at different pH values: values are means of four independent films (n=4, +/−SD) and different letter indicate significant differences (P<0.05)

The chelation of iron by anionic polymeric ligands is ionic in nature and therefore highly pH dependent. FIGS. 7 and 8 show that ferric ions complexed to a greater degree than ferrous ions. The ferric iron chelating activity of PE-ED-PAA was measured with sodium acetate/imidazole buffer (0.05 M) at pH 3.0, 5.0, and 7.0. From the results shown in FIG. 9, it can be seen that PE-ED-PAA had the highest ferric iron chelating activity at pH 5.0. The activity at pH 7.0 was slightly lower than that at pH 5.0. However, the unmodified PE film also had apparent ferric iron chelating activity at pH 7.0. Solublility of ferric ions decreases with increasing pH, so it is likely that the observed decrease in ferric ion concentration in the control (unmodified) PE films at pH 7.0 was likely a result of precipitation, not chelation. The chelating activity at pH 3.0 was much weaker than at pH 5.0 (P<0.05). The results indicate that the optimum pH for ferric iron complexation of PE-ED-PAA is 5.0. The optimum pH for the complexation of ferric iron by sodium salt of PAA is 5.4. Therefore, the results indicate that PAA immobilized on a PE surface has a similar pH optimum for ferric iron complexation as free PAA.

In addition to the effects of oxygen, free radicals, and other factors, the presence of trace metal ions in foods can promote oxidative deterioration such as lipid oxidation. Metal chelators such as EDTA are commonly included in food product formulations to prevent metal ion promoted oxidative degradation reactions. A novel metal chelating active packaging was successfully developed by the covalent immobilization of PAA to a functionalized PE surface. As cross-linking agents, low molecular weight homobifunctional amine compound ED introduced more available carboxylic acids to PE surface than the high molecular weight branched amine compound PEI. After covalent immobilization onto the PE surface, PAA still exhibited iron chelating capacity, and PE-ED-PAA exhibited an iron chelating activity of 2.43+/−0.22 nmol ferrous iron per $cm^2$ and 4.44+/−0.38 nmol ferric iron per $cm^2$, respectively. As the ligand-metal ratio of $Fe^{3+}$ was lower than that for $Fe^{2+}$, PAA-modified PE films have a higher affinity to $Fe^{3+}$ with the optimum binding pH at 5.0. One or more embodiments of the invention are directed to a method of preparing antioxidant active packaging films using an inexpensive polymeric metal chelator. Such films are best suited for liquid food products which are not a nutritionally important source of iron. The application of this economical metal chelating active packaging is useful in controlling iron-catalyzed lipid oxidation.

On a macromolecular scale, polymer packaging films are thick (on the order of 100 μm); yet, the portion of the film that directly interacts with the food is just the top several nanometers.

EXAMPLE 2

Materials

Commercial soybean oil (Wesson, 100% natural vegetable oil) was purchased from the local grocery store; polypropylene (PP, isotactic, pellets) was purchased from Scientific Polymer Products (Ontario, N.Y.); hydroxylamine hydrochloride, ferrous sulfate heptahydrate (99+%), imidazole (99%), ethylenediaminetetraacetic acid (EDTA), and 3-(2-pyridyl)-5,6-diphenyl-1,2,4-triazine-p,p'-disulfbnic acid disodium salt hydrate (ferrozine, 98+%) were purchased from Acros Organics (Morris Plains, N.J.); toluidine blue O (TBO) was purchased from MP Biomedicals (Solon, Ohio); isopropyl alcohol, acetone, heptane, ethanol, isooctane, methanol, 1-butanol, sodium acetate trihydrate, 4-(2-hyddroxyethyl)-1-piperazineethane-sulfonic acid (HEPES), hydrochloric acid, trichloroacetic acid (TCA), acetic acid glacial, Tween 20 (a non-ionic surfactant), and sodium hydroxide were purchased from Fisher Scientific (Fair Lawn, N.J.); acrylic acid (AA, anhydrous), barium chloride dihydrate, ammonium thiocyanate, cumene hydroperoxide (80%), and benzophenone (BP, 99%) were purchased from Sigma-Aldrich (St. Louis, Mo.): all the chemicals and solvents were used without further purification.

Preparation of PP Films

PP films with the average thickness of 225±25 μm were prepared with a Carver Laboratory Press (Model B, Fred S. Carver Inc., NJ, U.S.A). PP pellets were cleaned by sonicating in isopropyl alcohol, acetone, and deionized water (10 min per repetition, 2 repetitions per solvent) sequentially. The cleaned PP pellets were dried overnight over anhydrous calcium sulfate. The temperature of the Carver Press was set to 160° C. to melt PP pellets for 1 min, and 9000 lbs pressure was then loaded to press pellets into films. Large pieces of films were cut to 1×2 $cm^2$ pieces and cleaned and dried by the same procedure as the PP pellets. Typical commercial films contain a number of additives, including antioxidants, which may interfere with the graft polymerization process and subsequent antioxidant activity assays. Because the specific nature of these additives is unknown in commercial films, the films disclosed herein were prepared from polymer resins purchased from a polymer supply company (Scientific Polymer Products, Ontario N.Y.) to minimize the effect of such additives on the surface modification and antioxidant activity assays. Resins and heat pressed films were extensively cleaned to remove organic contaminants that commonly deposit from the environment, which may interfere with accurate surface analysis.

Photoinitiated Graft Polymerization

Figure 10:
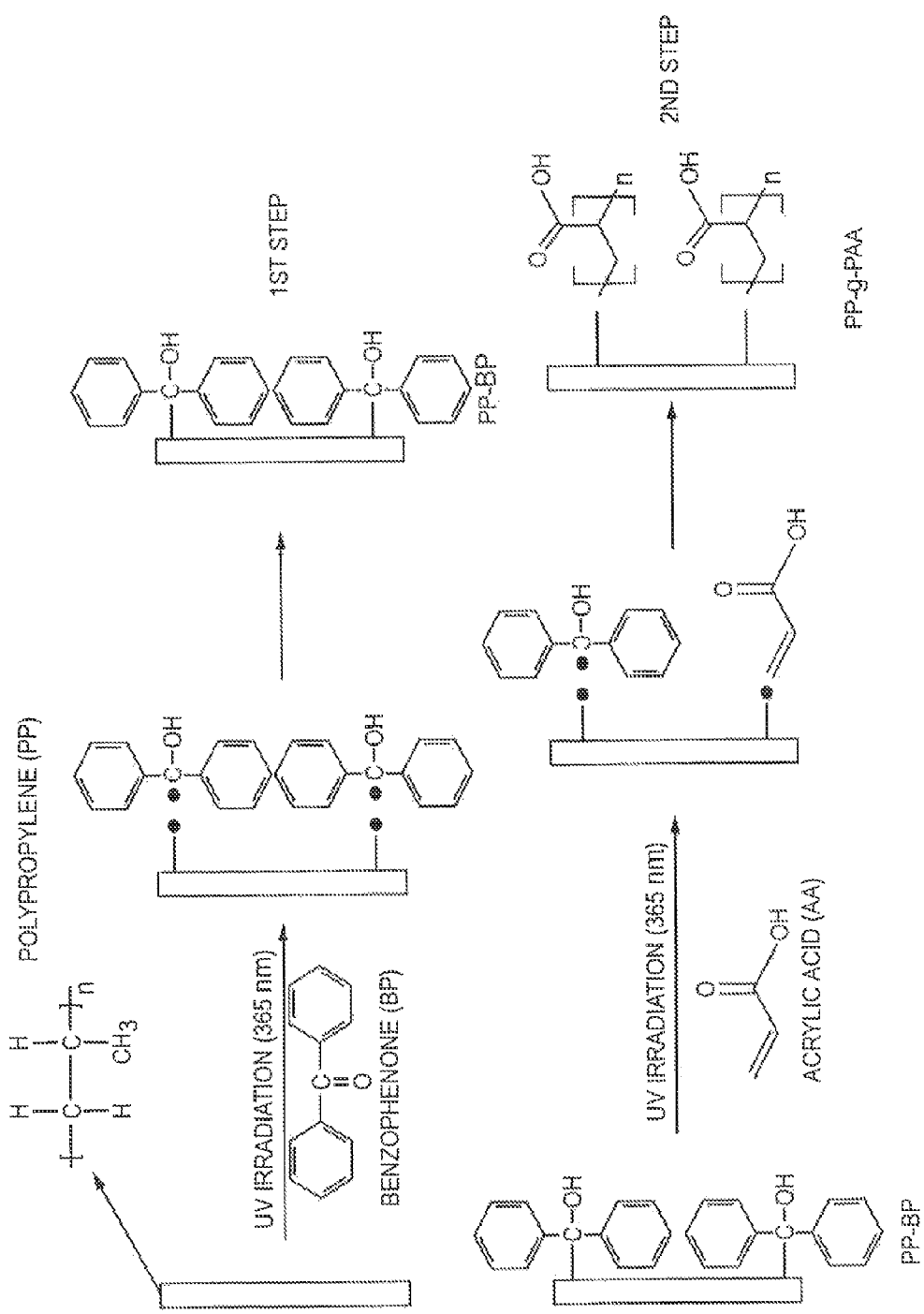
FIG. 10 is a diagram of sequential reaction steps of one example of a process for making an antioxidant packaging material of the invention showing the two-step photoinitiated graft polymerization of acrylic acid onto a polypropylene surface.
Figure 11:
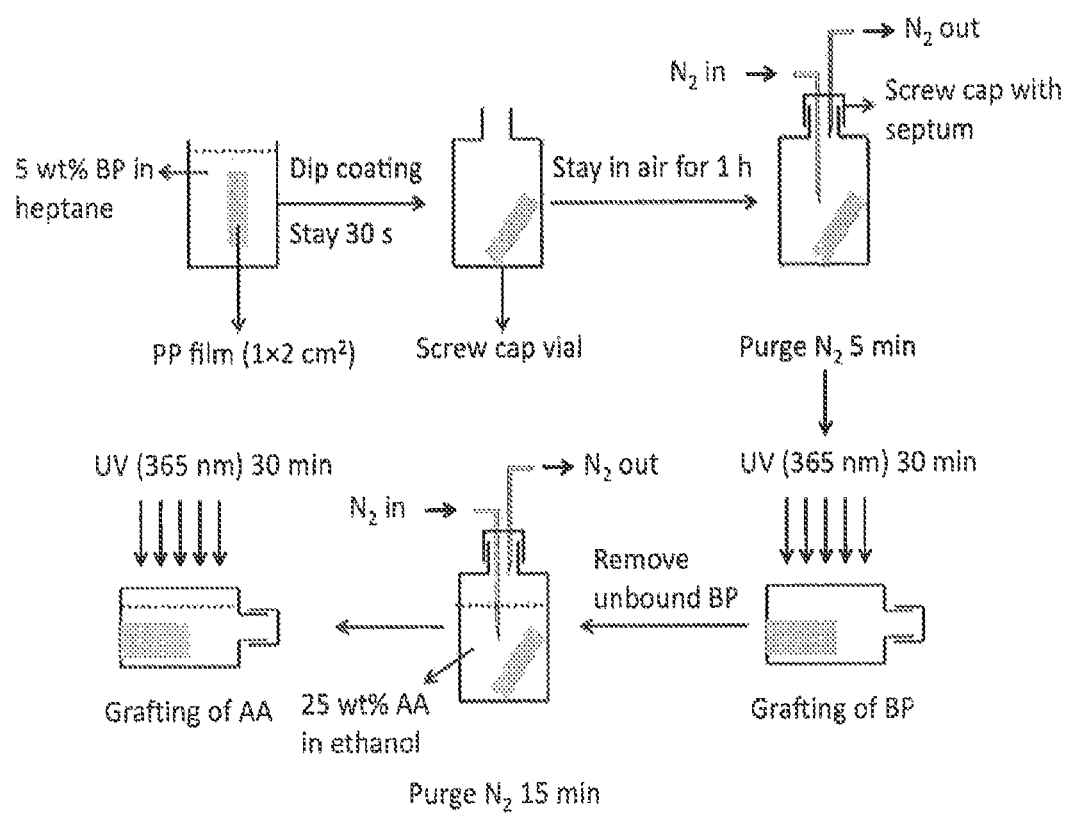
FIG. 11 is a schematic diagram of a procedure of one example of a process for making an antioxidant packaging material of the invention showing the two-step photoinitiated graft polymerization of acrylic acid onto a polypropylene surface.

Two-step sequential photoinitiated graft polymerization was used to graft AA onto the PP surface using an adaptation of the methods reported by Ma et al. (*Macromolecules* 2000, 33, 331-335) and Janorkar et al. (*Macromolecules* 2004, 37, 9151-9159). In the first step, the photoinitiator BP was covalently grafted to PP surface, and the graft polymerization of AA from the PP surface was initiated in the second step (FIG. 10). A schematic diagram of the procedure to do the two-step graft polymerization is shown in FIG. 11. While it is also possible to perform a one-step photoinitiated graft polymerization, foregoing the BP step, the BP surface initiation step ensures that the grafted PAA is covalently bound to the PP film and not just a cross-linked PAA coating. This is an important distinction for the application of active food packaging, for which covalent immobilization may be an important regulatory advantage.

Photoinitiated Grafting of BP to PP Films

In the first step, PP films were dip-coated in a 5 wt % solution of BP in heptane for 30 seconds to coat the outermost surface of the films with the photoinitiator. The BP coated film was then put into a headspace vial (Sigma-Aldrich, catalog no. SU860099). The vial was left in air with the top open for 1 h to allow the evaporation of residual heptane. A screw cap with septum (Sigma-Aldrich, catalog no. SU860101) was used to seal the vial. Nitrogen was purged into the sealed vial through needles (Fisher Scientific, catalog no. 305194) for 5 min to eliminate any oxygen that would inhibit the photoactivation of the BP and the subsequent grafting. The nitrogen purged vial was then transferred into a nitrogen glove bag (Model X-27-27, Glas-Col. LLC., IN) equipped with a 100 W Black-Ray ultraviolet (UV) lamp with spot bulb (TED PELLA, INC., CA). A black light filter is recessed in the head of the UV lamp, which delivers long-wave (365 nm) UV light with an intensity of 21.7 mW/cm$^2$ at a distance of 5 cm. UV irradiation of the BP coated film was performed for 30 min to covalently graft BP to PP surface. After irradiation, the film was taken out of the vial, and washed in 10 mL of acetone 3 times (5 min per time) using a rugged rotator (Fisher Scientific, Fair Lawn, N.J.) with the speed of 35 rpm to remove any unbound BP. The PP-BP film was dried in air at room temperature.

Photoinitiated Graft Polymerization of AA from PP Film Surfaces

In the second step, the PP-BP films were put into the screw cap vial with 6 mL of AA monomer ethanol solution (25 wt %), and sealed inside with the screw cap with septum. Nitrogen was purged into the solution through needles for 15 min to eliminate any oxygen. The vial was then put into the nitrogen glove bag, and exposed to UV radiation for 30 min. The AA grafted film (PP-g-PAA) was washed in deionized water with stirring using the method reported by Ulbricht and Yang (*Chem. Mater.* 2005, 17, 2622-2631) to completely remove the unreacted AA monomer and homopolymers generated in the photoinitiated polymerization process. Briefly, the films were submerged in deionized water with stirring for 30 min at room temperature, then stirred in a second beaker of fresh deionized water for 1 h at 60° C., and finally stirred in a third beaker of fresh deionized water for 30 min at room temperature. The grafted, washed PP-g-PAA film was used after being dried overnight over anhydrous calcium sulfate at room temperature.

Surface Analysis

ATR-FTIR Analysis

ATR-FTIR analysis of the modified and unmodified PP film surfaces was carried out on an IRPrestige-22 FTIR spectrometer (Shimadzu Scientific Instruments, Inc., Kyoto, Japan) with sample compartments and a diamond ATR crystal. At a 4-cm$^{-1}$ resolution, 32 scans were done for each spectrum against a reference spectrum of an empty ATR crystal. The resultant spectra were processed with SigmaPlot 10.0 (Systat. Software, Inc., Chicago, Ill.) and analyzed with KnowItAll Informatics System 8.1 (BioRad, Hercules, Calif.).

Contact Angle Analysis

The surface hydrophilicity of PP, PP-BP, and PP-g-PAA films was determined by measuring water contact angles of the films on a DSA 100 (Kruss, Hamburg, Germany) equipped with a direct dosing system (DO3210, Kruss, Hamburg, Germany). All measurements were conducted under atmospheric conditions with HPLC grade deionized water (Fisher Scientific, Fair Lawn, N.J.) as the probe liquid. Advancing and receding angles were determined with the water droplet volume of 3 μL and the increasing and decreasing speed of 10 μL/min. The angles were recorded every 0.10 s in the process of advancing and receding using tangent method-2. The reported advancing contact angles were the averages of six average means of advancing measurements, while receding contact angles were the averages of six last values of receding measurements (n=6, two measurements on each of three independent films).

Scanning Electron Microscopy (SEM) Analysis

The surface and cross-sectional morphologies of PP and PP-g-PAA films were obtained by field emission SEM (JEOL 6320 FXV). The films for SEM analysis were freeze-fractured in liquid nitrogen to observe their cross-sectional morphology. Surfaces and cross-sections were sputter-coated (Sputter coater, Cressington 108) with gold for 3 min before microscopic analysis.

Atomic Force Microscopy (AFM) Analysis

The surface topography of PP and PP-g-PAA films was analyzed by AFM (Digital Instruments, Dimension-3000 model) with a NanoScope IIIa controller. Tapping mode images of films in air were obtained using a silicon cantilever tip (uncoated, AppNano ACT-R-W type) with a spring constant of 40 N/m. The scan size was 50 μm×50 μm for each sample, and roughness was calculated as the root-mean-square (rms) roughness.

Dye Assay—Quantification of Carboxylic Acids

The amount of available carboxylic acids on PP and PP-g-PAA surface was measured by TBO dye assay. Each piece of PP and PP-g-PAA films was submerged into 5 mL of 0.5 mM TBO solution (in NaOH deionized water solution, pH 10.0) at 25° C., for 2 h. Non-complexed dye was removed by rinsing films in NaOH solution (pH 10.0) 3 times. The films were then submerged in 50 wt % acetic acid solution for 15 min to desorb the complexed dye on film surfaces. The absorbance of the acetic acid solution containing desorbed dye was detected at 633 nm. The carboxylic acid density of the film surface was calculated by comparing to a standard curve made of TBO dye in 50 wt % acetic acid solution.

Iron Chelating Assay

The activity of PP and PP-g-PAA films to chelate $Fe^{2+}$ iron was determined. A solution of ferrous sulfate heptahydrate (20 mM, in 0.05 M HCl) was added into a sodium acetate/imidazole buffer (0.05 M, pH 5.0) to make the iron buffer solution with the final $Fe^{2+}$ concentration of 1 mM. Four pieces of PP or PP-g-PAA films were submerged into 2.0 mL of iron buffer solution and rotated using a rugged rotator (Fisher Scientific, Fair Lawn, N.J.) with the speed of 35 rpm for 30 min. The films were then washed in deionized water 3 times to remove the unbound iron. Releasing agent was prepared with hydroxylamine hydrochloride (0.1 g/mL) and TCA (0.05 g/mL) to release the chelated iron from films. Each piece of film was submerged in 3.0 mL releasing agent and rotated for 2.5 h. The releasing agent (0.5 mL) was then added to 0.5 mL of ferrozine solution (9.0 mM in 50 mM HEPES buffer, pH 7.0). After 1 h, the absorbance of the reaction solution was detected at 562 nm. The iron chelating activity was determined by comparison to a standard curve made from ferrous sulfate heptahydrate.

Lipid Oxidation Measurement

The effectiveness of the iron-chelating PP-g-PAA films in preventing lipid oxidation was determined using an oil-in-water emulsion system stored at 37° C. Unmodified PP films and PP-g-PAA films were incubated with rotation in an oil-in-water emulsion, stabilized by Tween 20. Generation of lipid oxidation products (lipid hydroperoxides and hexanal) was quantified over time and compared to that of a sample of emulsion with no film (negative control) as well as an EDTA-containing emulsion as a positive control. Four independent preparations served as the replicates, and results are representative of oxidation data collected on two independent days.

A course emulsion consisting of 1 wt % soybean oil and an aqueous solution of 0.1 wt % Tween 20, and 50 mM sodium acetate/imidazole buffer (pH 7.0) was made by blending the lipid and aqueous phases for 2 min using a 2-speed hand held homogenizer (Biospec Products, Inc., Bartlesville, Okla.) at the low speed setting (7000 rpm). The course emulsion was then passed four times through a Microfluidics (Newton, Mass., USA) with a Y-shape interaction chamber at 9000 psi. The particle size distribution of the emulsion droplets was determined by laser diffraction (Mastersizer 2000 Particle Size Analyzer, Malvern Instruments Ltd, Worcestershire, UK). The final average droplet diameter of the emulsion ($D_{32}$) was determined to be 0.159+/−0.004 µm, which did not change during the storage study.

The EDTA-containing emulsion was prepared by dissolving EDTA in sodium acetate/imidazole buffer (50 mM, pH 7.0) followed by addition to the emulsion with stirring to make EDTA containing emulsion with the concentration of 0.01 mM.

Emulsions (1 mL) were added into screw capped glass vials and incubated in a dark incubator with shaking (180 rpm) at 37° C. for 14 days. Four pieces (1×1 cm²) of unmodified PP or modified PP-g-PAA films were placed into vials with 1 mL of emulsion to measure their lipid oxidation inhibiting activity.

Lipid hydroperoxides, the primary lipid oxidation products, were determined daily. Emulsion (0.3 mL) was added to 1.5 mL of isooctane/isopropanol (3:1 v/v) and vortexed 3 times (10 s per time). The mixed solution was separated by a centrifuge at the maximum speed (3400 g) for 5 min. The upper phase (200 uL) was then mixed with 2.8 mL of methanol/1-butanol (2:1 v/v), 15 uL of ammonium thiocyanate (3.94 M) and 15 uL of ferrous iron solution. The clear ferrous iron solution was prepared by centrifugation (1000 rpm, 2 min) of a mixture of equal amount of 0.132 M $BaCl_2$ (dissolved in 0.4 M HCl) and 0.144 M $PeSO_4$. The absorbance of the reaction solution was detected at 510 nm after 20 min of incubation at room temperature. Hydroperoxide concentrations were calculated by comparison to a standard curve made from cumene hydroperoxide. The lag phase of the lipid hydroperoxide formation in emulsions was defined as the day before which the hydroperoxide concentration significantly increased as compared to initial concentrations ($P<0.05$).

The amount of hexanal in the headspace of the vial was determined using a gas chromatograph (GC, Shimadzu GC-2014, Tokyo, Japan) equipped with an autoinjector (AOC-5000, Shimadzu, Tokyo, Japan) and a flame ionization detector (FID). The sample vial was warmed up at at 55° C. for 8 min. A divinylbenzene/carboxen/polydimethylsiloxane (DVB/Carboxen/PDMS) stable flex SPME fiber (50/30 µm, Supelco, Bellefonte, Pa.) was then inserted through the septum into the vial and exposed to the sample headspace for 2 min. The fiber was desorbed at 250° C. for 3 min in the detector at a split ratio of 1:7. The chromatographic separation of volatile lipid oxidation compounds was performed on a fused-silica capillary column (30 m×0.32 mm i.d.×1 µm) coated with 100% poly(dimethylsiloxane) (Equity-1, Supelco). The temperatures of the oven, injector, and detector were 65, 250, and 250° C., respectively. The run time for each sample was 10 min. The concentration of hexanal was calculated according to the standard curve made from emulsions containing known amounts of hexanal and 0.2 mM EDTA. The lag phase of the hexanal formation in emulsions was defined as the day before which the hexanal concentration significantly increased as compared to initial concentrations ($P<0.05$).

Statistical Analysis

The data presented are means±standard deviation (SD) of at least four replicate determinations, from four preparations of film. To prepare samples for each determination, individual films (1×2 cm²) were placed in separate, independent vials to perform the grafting of initiator/monomer. Results are representative of results of two independent studies performed on different days. SPSS Release 17.0 (SPSS Inc., Chicago, Ill.) was used to do the statistical analyses. One-way analysis of variance (ANOVA) followed by Duncan's pairwise comparison was conducted to determine differences ($P<0.05$).

Photoinitiated Graft Polymerization and the Surface Characterization of PP-g-PAA The two-step sequential photoinitiated graft polymerization of AA from the surface of PP films was used to introduce metal-chelating carboxylic acids as an active packaging technology (FIG. 10). In the first step, the photoinitiator BP undergoes a photo-induced excitation after exposure to UV irradiation, and the excited BP can then abstract the tertiary hydrogen from the PP film surface to generate surface radicals and semipinacol radicals. These two radicals combine to form surface initiators without the presence of monomers. In the second step, the C—C bond of the surface initiator formed in the first step is cleaved by UV irradiation to regenerate surface radicals and semipinacol radicals. The surface radicals attack the C=C of the monomer to initiate the graft polymerization. The semipinacol radicals prefer to combine with growing polymeric chain radicals. After termination, the semipinacol can split off to reinitiate the polymerization, and then to increase the polymer chain length.

Figure 12:
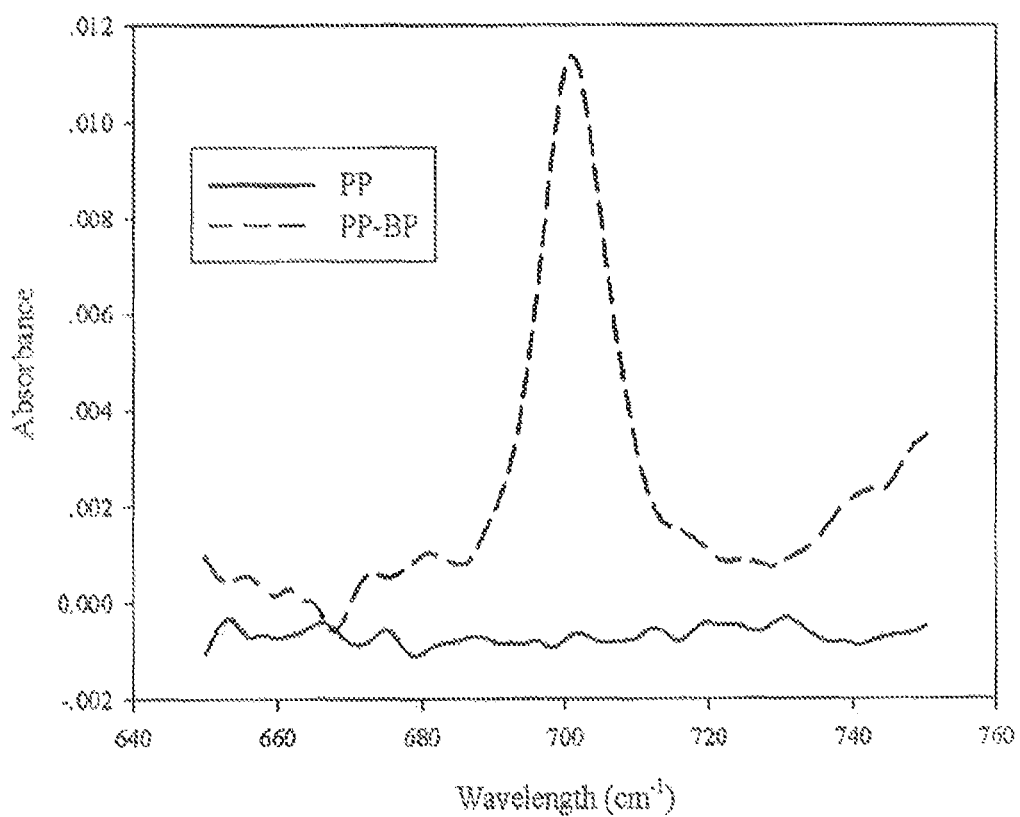
FIG. 12 is an ATR-FTIR spectra of PP and PP-BP films.

The infrared spectra of PP and PP-BP obtained from ATR-FTIR are shown in FIG. 12. A new absorption band at 690-710 $cm^{-1}$, characteristic absorbance corresponding to the aromatic ring from BP, was observed in the spectra of PP-BP. This indicated that BP was successfully grafted to the PP surface in the first step.

Figure 13:
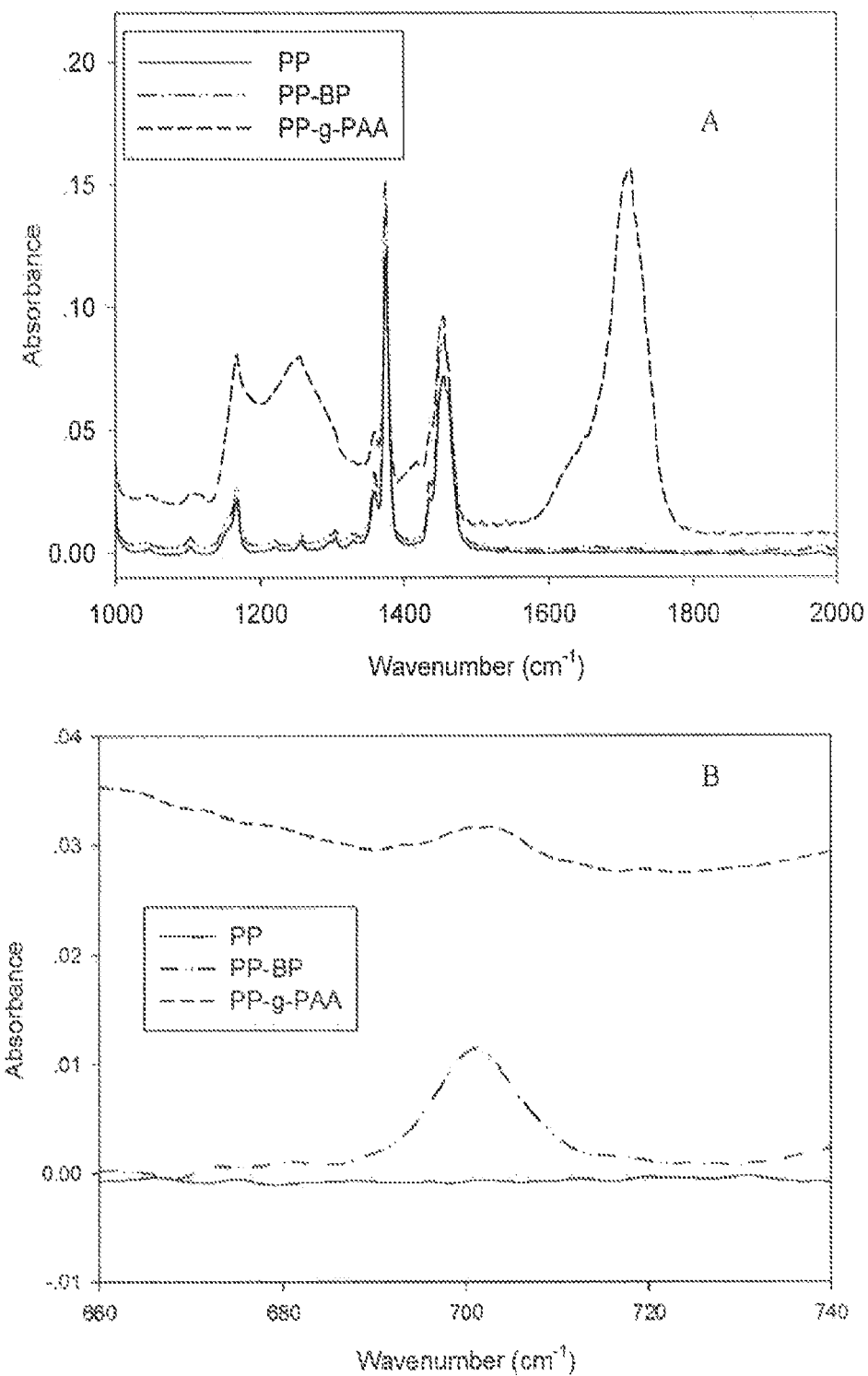
FIG. 13A is an ATR-FTIR spectra of PP, PP-BP, and PP-g-PAA films in the range of 1000-2000 $cm^{-1}$.
FIG. 13B is an ATR-FTIR spectra of PP, PP-BP, and PP-g-PAA films in the range of 660-740 $cm^{-1}$.

ATR-FTIR spectroscopy was performed on control and modified films to evaluate the surface chemistry at various points in the graft polymerization process. FIGS. 1A-B show the ATR-FTIR spectra of PP-g-PAA in comparison with the spectra of PP and PP-BP. Two new strong absorption bands were observed in the spectra of PP-g-PAA (FIG. 13A). One is at 1700-1725 $cm^{-1}$, which is attributable to the C=O of carboxylic acids. The other one is the C—O hand of carboxylic acids at 1211-1320 $cm^{-1}$. These indicated the successful grafting of the poly(acrylic acid) chain onto the PP surface. In FIG. 13B, a significant decrease of the absorbance at 690-710 $cm^{-1}$ was evident in the spectra of PP-g-PAA compared to PP-BP. This confirmed the cleavage of the C—C bond of the surface initiator, confirming successful initiation of graft polymerization by the surface radicals.

Contact Angle Analysis

The advancing and receding water contact angles of the native and modified PP films were measured to determine the effect of AA grafting on the hydrophilicity of film surfaces (FIG. 19). Both of the advancing and receding angles of native PP films were very high, with low hysteresis, indicating a clean, hydrophobic surface. After the grafting of BP, the advancing angle of the film surface had no difference with that of the native PP film surface, while the receding angle was lower. This increase in hysteresis indicates successful introduction of the reactive BP sites, which introduce slight polarity to the surface. The advancing and receding angles all dramatically decreased after the grafting of PAA, especially the receding angle, which decreased by more than 60 degrees as compared to the PP and PP-BP films. The results indicate a significant increase in surface hydrophilicity of PP-g-PAA, likely a result of the introduction of polar, ionizable carboxylic acids as confirmed by FTIR spectra and dye assay analysis. The hysteresis of PP-g-PAA was much higher than that of PP and PP-BP. The increase in surface roughness, surface chemical heterogeneity, and the increased interactions between the surface and the water droplet after the grafting of flexible PAA graft chains likely influenced this high hysteresis.

Figure 16:
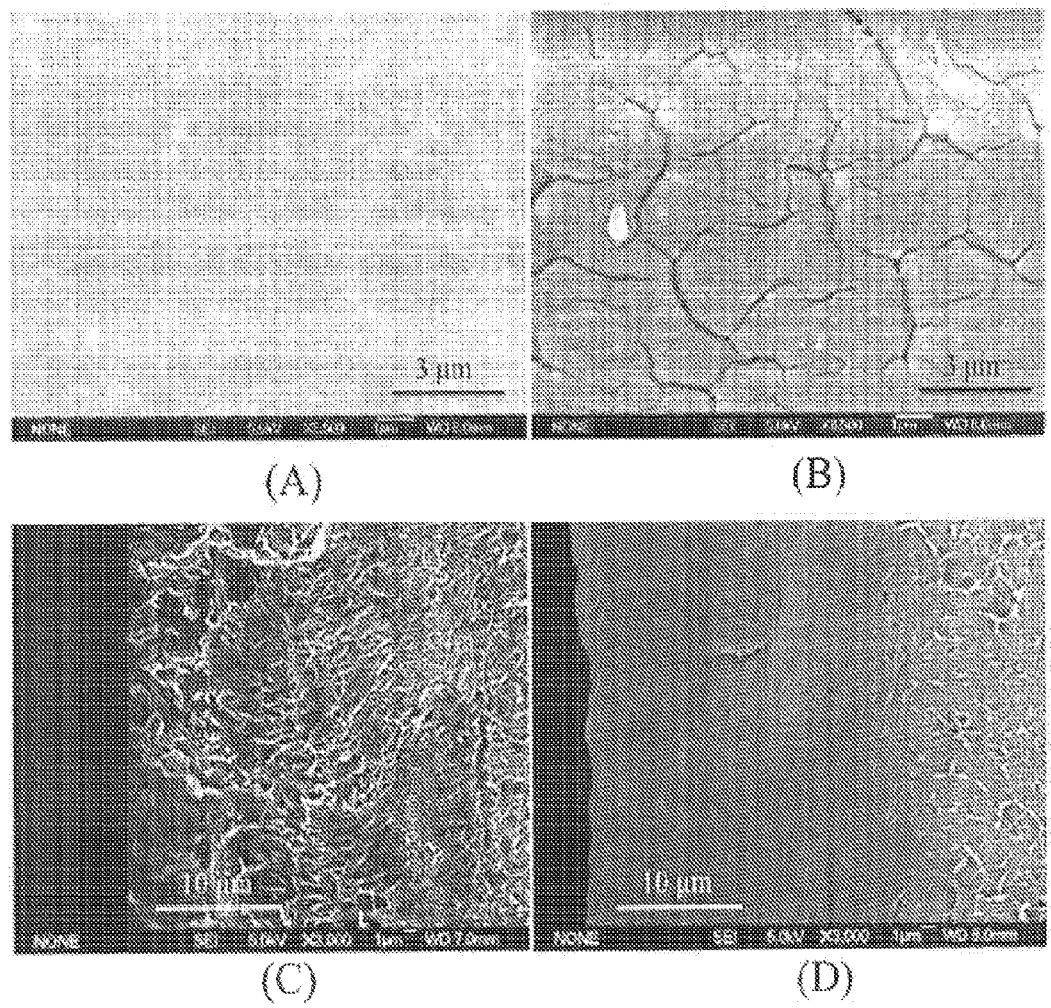
FIGS. 16A-D are Scanning Electron Micrographs (SEM's) of the (A) PP film surface, (B) PP-g-PAA film surface (C) PP film cross section, and (D) PP-g-PAA film cross-section.
Figure 17:
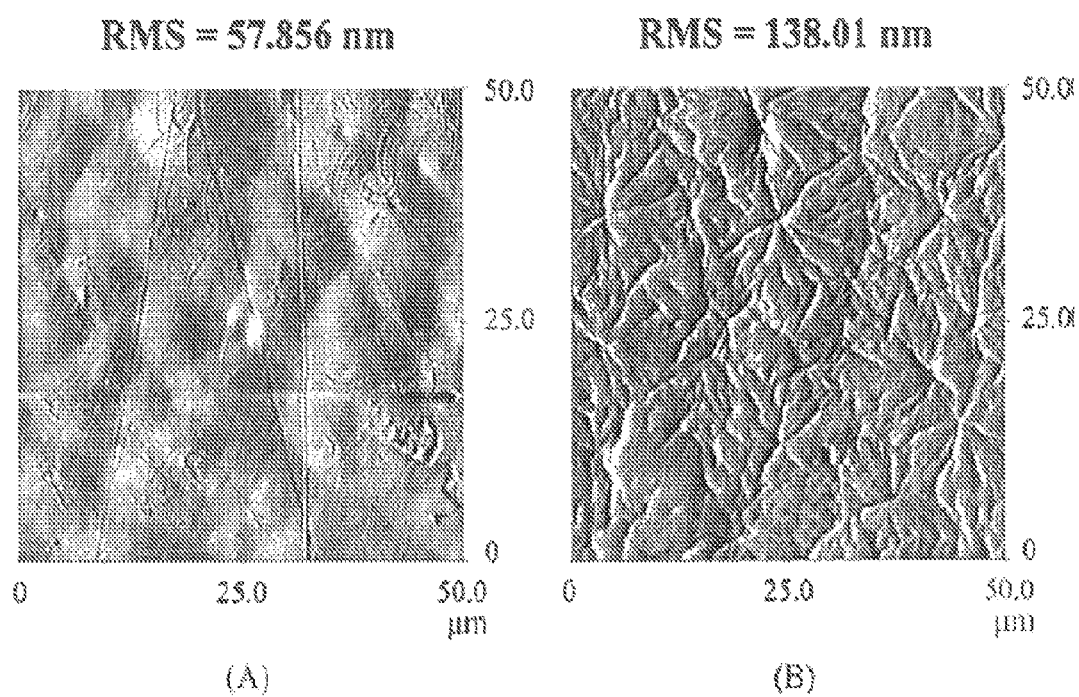
FIGS. 17A-B are Atomic Force Microscopy (AFM) amplitude images and rms roughness of the (A) PP film surface and (B) PP-gPAA film surface.

Surface and cross-sectional SEM images as well as AFM images were obtained to evaluate morphology of control and modified films (FIGS. 16A-D and 17A-B). Both the surface and the cross-sectional SEMs of native PP film suggested a uniform morphology with no noticeable defects (FIGS. 16A, C). The surface of PP-g-PAA presented a cracklike morphology (FIGS. 16B and 17B). This cracklike surface morphology may be due to the shrinking and cracking upon drying of the grafted hydrophilic polymers. Aside from the evident cracking, the surface morphology was uniform, indicating uniform grafting across the surface. The uniformity of the grafted PAA was determined by taking SEMs at three points on cross-sections of three independently prepared PP-g-PAA films and measuring the thickness of the graft and was determined to be 17.6+/−4.4 μm. A representative cross-sectional SEM is depicted in FIG. 16D. The cross-sectional SEM of PP-g-PAA films exhibits two distinct phases, in which the left-most surface layer (PAA graft) shows a different texture with the substrate material. The absence of a clear, sharp interface between PP substrate and FAA graft indicates that some BP initiator and subsequent AA monomer penetrated the surface of the PP film, further supporting that delamination of the active PAA graft from the PP substrate is unlikely.

Surface roughness of PP and PP-gPaa films was quantified using AFM on dried samples (FIGS. 17A-B). The surface of unmodified PP film (FIGS. 17A) exhibited some degree of roughness (calculated rms roughness value of 57.856 nm), which is likely due to scratches obtained during hot pressing and washing. In agreement with the SEM images, AFM images revealed a cracklike surface morphology on the PP-g-PAA film surface (FIG. 17B). This suggests that these cracks are likely a result of the shrinking of highly hydrophilic PAA polymers under dry condition. After grafting, the surface roughness of PP-g-PAA was more than two times higher than that of PP control, which further explains the high contact angle hysteresis.

Dye Assay

TBO dye assay was performed to quantify the carboxylic acid density on the surface of PP and PP-g-PAA films. The dye assay not only can quantify the amount of the available carboxylic acids grafted onto the PP surface, it also provides a qualitative indication of the surface uniformity of the grafting by color. A layer of blue color dye was observed uniformly distributed on the PP-g-PAA film surface after the adsorption reaction in basic TBO dye solution, indicating a uniform grafting of PAA on PP film surface. After the polymeric grafting of AA, a large amount of available carboxylic acids was detected on the surface of PP-g-PAA film (68.67±9.99 nmol/cm$^2$, FIG. 14). This confirmed the successful grafting of AA on the PP film surface.

Ferrous Iron Chelating Activity

Figure 14:
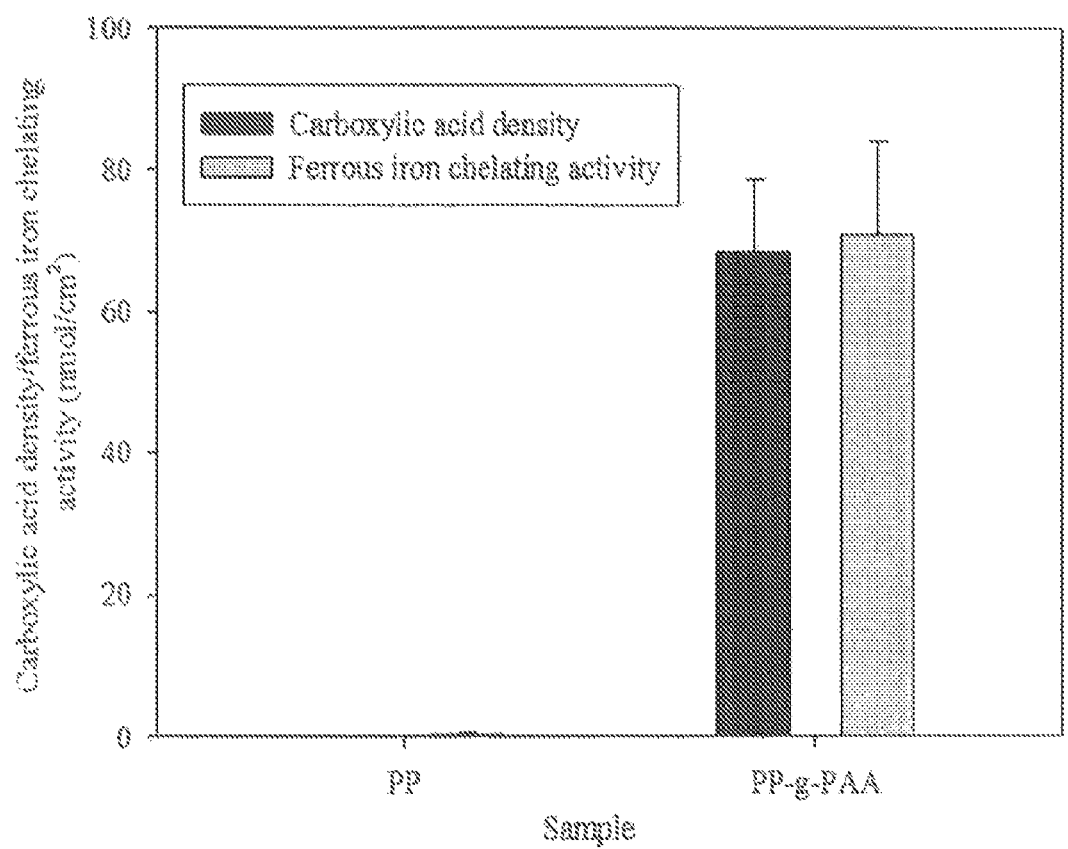
FIG. 14 is a bar graph of the carboxylic acid density and ferrous iron chelating activity of the surface of PP and PP-g-PAA: values are means of six independent films (n=6, +/−SD)
Figure 15:
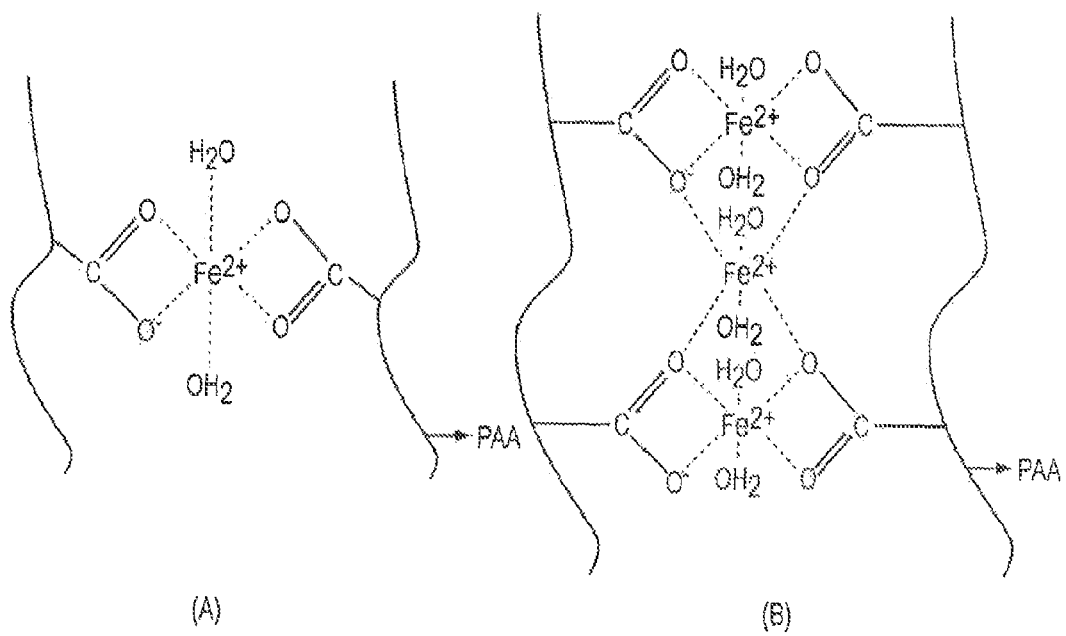
FIGS. 15A-B are drawings of the octahedral structure of the carboxylic acid/$Fe^{+2}$ complex with the ligand/metal ratio being 2 (A) and 1 (B)

The ferrous iron chelating activity of PP and PP-g-PAA films is shown in FIG. 14. The PP-g-PAA film exhibited significantly greater ferrous iron chelating activity (71.07±12.95 nmol/cm$^2$) compared to the PP film (0.31±0.30 nmol/cm$^2$). As the carboxylic acid density of the PP-g-PAA film is 68.67±9.99 nmol/cm$^2$, the ligand (carboxylic acid) to metal (Fe$^{2+}$) ratio is 1. The theoretical ligand to metal binding ratio for carboxylic acids and ferrous ions is 2, in which two carboxylic acids bind four of the six coordination sites of iron and balance the two positive charges. In this structure, two water molecules bind the remaining two coordination sites to form the most stable octahedral complex structure (FIG. 15A). When bound in this manner, ferrous ions are completely enveloped and lose their ability to catalyze oxidative degradation reactions like lipid oxidation. Without intending to be bound by theory, there are two potential explanations for achieving a ligand/metal ratio near 1 as observed herein. It has been reported that ligand-metal complexes with a net cationic charge can be formed in a 1:1 ratio of COOH:Fe$^{2+}$ as illustrated in FIG. 15B. It is also possible that the steric restriction of the PP substrate and the surrounding carboxylic acids in the PAA grafts inhibit the formation of an octahedral complex structure. Therefore, it is possible to "incompletely" bind iron ions by less than the six total coordination sites, in this case, while the metal ions retain some activity, it will be inhibited to some extent. Moreover, as an active packaging film, even incomplete binding of iron ions will result in their physical separation from the food matrix, which offers an additional means to inhibit lipid oxidation.

Figure 18:
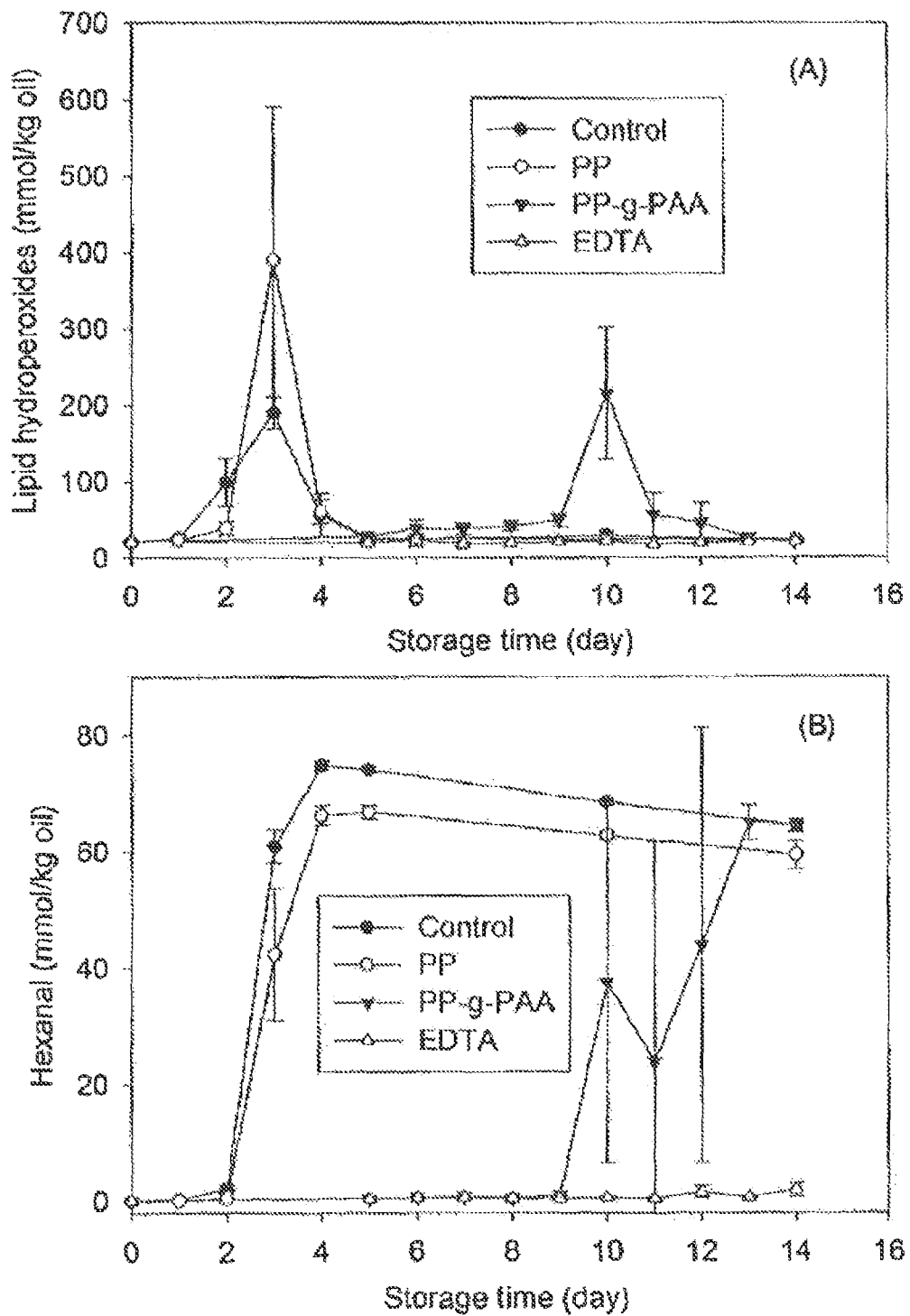
FIGS. 18A-B are line graphs of the generation of lipid hydroperoxides (A) and hexanal (B) concentrations of soybean oil-in-water emulsion stored at 37° C. and measured over 14 day's.

Lipids are susceptible to oxidative degradation, a major cause of food quality deterioration. Lipid hydroperoxides are the main products in the early oxidation stages. These primary oxidation products are unstable and prone to be decomposed to secondary oxidation products, which are a complex mixture of volatile, nonvolatile, and polymeric compounds. Hexanal is an important volatile aldehyde decomposed from hydroperoxides of ω-6 fatty acids, the predominant unsaturated fatty acids in soybean oil. The formation of hydroperoxides and hexanal of oil-in-water emulsions alone, with unmodified PP film, with PP-g-PAA film, and with added EDTA as a positive control, was measured during storage at pH 7.0 to quantify the ability of the PP-g-PAA active packaging films to inhibit lipid oxidation (FIGS. 18A-B).

Lipid oxidation occurred rapidly in the oil-in-water emulsion control, with the lag phase of lipid hydroperoxides and hexanal formation of 1 and 2 days, respectively. The emulsion incubated with PP also was oxidized very fast, with the lag phase of both lipid hydroperoxides and hexanal formation of 2 days. The EDTA positive control effectively inhibited lipid oxidation for the duration of the study. Lipid oxidation was also strongly inhibited by the PP-g-PAA films, in which the lag phase of lipid hydroperoxides and hexanal formation was extended to 9 days. The results of the lipid oxidation experiments, in conjunction with those of the dye assay and iron-chelating assays, indicate that PP-g-PAA films are effective in inhibiting the oxidation of oil-in-water emulsions by chelation of prooxidant ferrous ions.

A nonmigratory metal-chelating active packaging film with antioxidant activity was prepared by the photoinitiated graft polymerization of AA onto PP film surface. The grafted PAA layer significantly increased the hydrophilicity of PP films and had a thickness of 17.6+/−4.4 μm. The polymerization reaction yielded grafted carboxylic acids of 68.67+/−9.99 nmol per cm$^2$ film surface, with ferrous iron-chelating activity of 71.07+/−12.95 nmol per cm² film surface. As compared to the native PP films, PP-g-PAA films effectively inhibited lipid oxidation in a soybean oil-in-water emulsion system, dramatically extending the lag phases of the formation of lipid hydroperoxides and hexanal from 2 to 9 days.

Preliminary calculations were performed to estimate how the reported film-chelating capacity compares to an equivalent concentration of EDTA in a model-packaged product system. The total surface area of a typical half gallon (1.89 L) carton is approximately 960 cm². A model package of those dimensions made with the film of the current invention (iron-chelating capacity of 71.07 nmol/cm²) can therefore chelate 68.2 μmol iron. As 2 mol of EDTA is needed to bind 1 mol of iron, this correlates to 136.5 μmol EDTA or 72.2 μmol EDTA for the model 1.89 L carton. It has been reported that the concentration of EDTA required to dramatically decrease lipid oxidation is only 2.5 μM. The maximum concentration of EDTA permitted by the FDA to be added into beverages is 33 ppm, which is 113 μM. The PP-g-PAA films disclosed herein have an equivalent chelating activity of 72.2 μM EDTA, which is well above the minimum concentration of EDTA required to inhibit lipid oxidation (2.5 μM) and on the order of, but below, the FDA maximum (113 μM).

The PP-g-PAA films developed and characterized herein offer a novel means to inhibit transition metal-promoted oxidation of important nutritional and quality factors in packaged foods. The covalent surface-initiated graft polymerization technique is a novel means to generate nonmigratory active packaging films at a low cost. Development of such an effective and economical active packaging film represents a promising means by which to reduce additive use in food industry while maintaining high food quality.

What is claimed is:

1. A packaging material comprising one or more ion chelators covalently attached to at least one side of said material, wherein said material is selected from the group consisting of films, particles, spheres, fibers, multilaminates, bioreactor packing material, bottles and jars, and wherein said one or more ion chelators is selected from the group consisting of deferoxamine, ethylene diaminetetraacetic acid, poly(acrylic acid), hydroxamic acid, biomimetic synthetic sideorophores, desferroxamine-analogs with dydroxamic acid functionality, and combinations thereof.

2. The packaging material of claim 1, wherein said material is selected from the group consisting of a polymer, glass, aluminum, magnetic core particles, naturally derived fibers and inorganic materials.

3. The packaging material of claim 1, wherein said at least one side is in contact with a product.

4. The packaging material of claim 3 wherein said product is selected from the group consisting of food, beverages, pharmaceuticals, neutraceuticals, consumer products, paints and chemicals.

5. The packaging material of claim 4, wherein said consumer product is selected from the group consisting of face creams, lotions, conditioners and cosmetics.

6. The material of claim 2, wherein said polymer is a thermoplastic polymer selected from the group consisting of polyethylene, polypropylene, polyester, polystyrene, nylon and vinyls.

7. The material of claim 6, wherein said polyester is polyethylene Terephthalate, or polylactic acid.

8. The material of claim 6, wherein said vinyl is selected from the group consisting of ethylene vinyl acetate, ethylene vinyl alcohol, polyvinyl chloride and polyvinylidine chloride.

9. The material of claim 2, wherein said polymer is a hydrogel-forming polymer selected from the group consisting of hydroxyethylmethacrylate, chitosan and polyethyleneglycol.

10. The material of claim 2, wherein said polymer is polydimethylsiloxane.

11. A method of making an ion chelator-modified material comprising:
    a) exposing unmodified material to ultraviolet radiation;
    b) attaching a cross-linking agent to at least one surface of the irradiated material; and
    c) attaching one or more ion chelators to said cross-linking agent.

12. The method of claim 11, wherein said material is a polymer.

13. The method of claim 11, wherein said cross-linking agent is an amine compound.

14. The method of claim 13, wherein said amine compound is selected from the group consisting of polyethylenimine and ethylenediamine.

15. The method of claim 11, wherein said one or more ion chelators is selected from the group consisting of deferoxamine, ethylene diaminetetraacetic acid, poly(acrylic acid), hydroxamic acid, biomimetic synthetic siderophores, desferroxamine-analogs with hydroxamic acid functionality, and combinations thereof.

16. A method of preserving a product comprising storing said product in a packaging material having one or more ion chelators covalently attached to at least the side of said packaging material in contact with said product, wherein said one or more ion chelators is selected from the group consisting of deferoxamine, ethylene diaminetetraacetic acid, poly(acrylic acid), hydroxamic acid, biomimetic synthetic siderophores, desferroxamine-analogs with hydroxamic acid functionality, and combinations thereof.

17. The method of claim 16, wherein said material is selected from the group consisting of films, particles, spheres, fibers, multilaminates, bioreactor packing material, bottles and jars.

18. The method of claim 16, wherein said material is selected from the group consisting of a polymer, glass, aluminum, magnetic core particles, naturally derived fibers and inorganic materials.

19. The method of claim 16, wherein said product is selected from the group consisting of food, beverages, pharmaceuticals, neutraceuticals, consumer products, paints and chemicals.

20. The method of claim 19, wherein said consumer product is selected from the group consisting of face creams, lotions, conditioners and cosmetics.

21. The method of claim 18, wherein said polymer is a thermoplastic polymer selected from the group consisting of polyethylene, polypropylene, polyester, polystyrene, nylon and vinyls.

22. The method of claim 21, wherein said polyester is polyethylene Terephthalate or polylactic acid.

23. The method of claim 21, wherein said vinyl is selected from the group consisting of ethylene vinyl acetate, ethylene vinyl alcohol, polyvinyl chloride and polyvinylidine chloride.

24. The method of claim 18, wherein said polymer is a hydrogel-forming polymer selected from the group consisting of hydroxyethylmethacrylate, chitosan and polyethyleneglycol.

25. The method of claim 18, wherein said polymer is polydimethylsiloxane.

26. The method of claim 16, wherein said preserving comprises inhibiting lipid oxidation.

27. The method of claim 16, wherein said preserving comprises inhibiting loss of nutrients.

28. The method of claim 16, wherein said preserving comprises inhibiting color loss.

* * * * *